(12) United States Patent
Hirai et al.

(10) Patent No.: US 7,945,152 B2
(45) Date of Patent: May 17, 2011

(54) FOCUS ADJUSTMENT METHOD, FOCUS ADJUSTMENT APPARATUS, AND CONTROL METHOD THEREOF

(75) Inventors: Shinya Hirai, Kawasaki (JP); Kota Terayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 11/743,338

(22) Filed: May 2, 2007

(65) Prior Publication Data

US 2007/0263997 A1 Nov. 15, 2007

(30) Foreign Application Priority Data

May 10, 2006 (JP) .................................. 2006-131810
Sep. 14, 2006 (JP) .................................. 2006-249748

(51) Int. Cl.
*G03B 3/10* (2006.01)
(52) U.S. Cl. ....................................... 396/123; 348/349
(58) Field of Classification Search .................. 396/123; 348/349

See application file for complete search history.

(56) References Cited

U.S. PATENT DOCUMENTS

| | | | |
|---|---|---|---|
| 5,870,635 A | 2/1999 | Shindo et al. ..................... 396/96 |
| 6,297,846 B1 * | 10/2001 | Edanami ....................... 348/239 |
| 6,301,440 B1 | 10/2001 | Bolle et al. ...................... 396/128 |
| 6,816,611 B1 | 11/2004 | Hagiwara et al. ............... 382/165 |
| 2003/0071908 A1 | 4/2003 | Sannoh et al. .................. 348/345 |
| 2003/0142209 A1 | 7/2003 | Yamazaki et al. ............... 348/143 |
| 2003/0164892 A1 | 9/2003 | Shiraishi et al. ................ 348/349 |
| 2004/0125229 A1 | 7/2004 | Aoyama et al. ................ 348/345 |
| 2004/0207743 A1 | 10/2004 | Nozaki et al. |
| 2004/0246369 A1 | 12/2004 | Yamazaki ....................... 348/374 |
| 2005/0031325 A1 | 2/2005 | Fujii ................................ 396/54 |
| 2005/0099523 A1 | 5/2005 | Konishi et al. ................. 348/345 |
| 2005/0104993 A1 | 5/2005 | Matsumoto ..................... 348/345 |
| 2005/0174451 A1 | 8/2005 | Nozaki et al. ............. 348/240.99 |
| 2005/0270410 A1 | 12/2005 | Takayama ...................... 348/345 |

(Continued)

FOREIGN PATENT DOCUMENTS

CN 1716078 A 1/2006

(Continued)

OTHER PUBLICATIONS

Dec. 5, 2008 Chinese Official Action in Chinese Patent Appln. No. 200710102052.X (with translation).

(Continued)

*Primary Examiner* — W. B. Perkey
*Assistant Examiner* — Fang-Chi Chang
(74) *Attorney, Agent, or Firm* — Fitzpatrick, Cella, Harper & Scinto

(57) ABSTRACT

An apparatus comprises a face position detection section for detecting at least a position at which is present a person's face inside a frame using an image signal obtained from an image sensor for photoelectrically converting an object image captured by a photographing optical system, a focus control section for controlling the photographing optical system by referencing in-focus positions of the object image obtained inside focus detection areas for detecting focus states of the object image positioned in the frame, and a control section for controlling the focus control section so as to reference at least one or the other of an in-focus position obtained in a first focus detection area in which is present a person's face and an in-focus position obtained in a second focus detection area in which is expected to be present a body of a person determining from the position of the face of the person.

18 Claims, 16 Drawing Sheets

U.S. PATENT DOCUMENTS

| | | | | |
|---|---|---|---|---|
| 2006/0182433 | A1 | 8/2006 | Kawahara et al. | 396/123 |
| 2007/0013791 | A1* | 1/2007 | Kinoshita et al. | 348/239 |
| 2007/0064145 | A1* | 3/2007 | Sugimoto | 348/345 |
| 2008/0074529 | A1* | 3/2008 | Terashima | 348/345 |

FOREIGN PATENT DOCUMENTS

| | | |
|---|---|---|
| JP | 2-210335 | 8/1990 |
| JP | 6-331883 | 12/1994 |
| JP | 10-232934 | 9/1998 |
| JP | 2000-48184 | 2/2000 |
| JP | 2002-244021 | 8/2002 |
| JP | 2003-075717 | 3/2003 |
| JP | 2003-107335 | 4/2003 |
| JP | 2005-209012 | 8/2005 |
| JP | 2005-223658 | 8/2005 |
| JP | 2006-18246 | 1/2006 |
| JP | 2006-227080 | 8/2006 |

OTHER PUBLICATIONS

Apr. 11, 2008 Japanese Official Action in Japanese Patent Appln. No. 2006-131810 (with translation).

Sep. 2, 2008 Japanese Official Action in Japanese Patent Appln. No. 2006-249748 (with translation).

Jun. 3, 2009 Communication in European Patent Appin. No. 07107449.6.

Saeed Shiry Ghidary, et al., "Human Detection and Localization at Indoor Environment by Home Robot", Systems, Man, and Cybernetics, 2000 IEEE International Conference on Nashville, TN, USA, Oct. 8-11, 2000, Piscataway, NJ, USA, IEEE, US, vol. 2, Oct. 8, 2000, pp. 1360-1365, XP010524846, ISBN: 978-0-7803-6583-4.

"Nikon Face-priority AF" Nikon Press Release, Online, Feb. 16, 2005, pp. 1-3, XP002528748, Retrieved from the Internet: URL:http://www.dpreview.com/news/0502/05021604nikonfaceaf.asp (retrieved on May 19, 2009).

Murali Subbarao, et al., "Depth from Defocus and Rapid Autofocusing: A Practical Approach", Proceedings of the Computer Society Conference on Computer Vision and Pattern Recognition, Champaign, IL, Jun. 15-18, 1992, New York, IEEE, US, Jun. 15, 1992, pp. 773-776, XP010029408, ISBN: 978-0-8186-2855-9.

Jingqiang Li, "Autofocus searching algorithm considering human visual system limitations", Optical Engineering, Online, vol. 44, No. 11, Nov. 2005, pp. 113201-1-113201-4, XP002528749, Retrieved from the Internet: URL:http//spiedl.aip.org/getpdf/servlet/GetPDFServlet?filetype=pdf
&id=OPEGAR000044000011113201000001&idtype=cvips
&prog=normal (retrieved on May 19, 2009).

Jie He, et al., "Modified Fast Climbing Search Auto-focus Algorithm with Adaptive Step Size Searching Technique for Digital Camera", IEEE Transactions on Consumer Electronics, Online, vol. 49, No. 2, Jul. 9, 2003, pp. 257-262, XP002528750, ISSN: 0098-3063, Retrieved from the Internet: URL:http://ieeexplore.ieee.org/stamp/stamp.jsp?tp=&arnumber=1209511&isnumber=27208>(retrieved on May 19, 2009).

Margrit Betke, et al., "The Camera Mouse: Visual Tracking of Body Features to Provide Computer Access for People With Severe Diabilities", IEEE Transactions on Neural Systems and Rehabilitation Engineering, IEEE Service Center, New York, NY, US, vol. 10, No. 1, Mar. 1, 2002, XP011078067, ISSN: 1534-4320.

* cited by examiner

FACE DETECTION POSITION AND FOCUS DETECTION POSITION

RELATED FOCUS DETECTION POSITION

FOCUS ADJUSTMENT METHOD, FOCUS ADJUSTMENT APPARATUS, AND CONTROL METHOD THEREOF

BACKGROUND OF THE INVENTION

1. Field of the Invention

The present invention relates to a technology for performing auto-focusing using face detection information.

2. Description of the Related Art

Conventionally, when photographing an object image with an auto-focus camera in which the focus detection area is fixed in the middle of the frame, it has been necessary to place the object image in the center, engage the focus lock, and then compose the photograph.

A method has therefore been developed for setting a plurality of focus detection areas inside the frame with the object of making auto-focus possible without changing the composition of the photograph, namely, without using the focus lock. This technology has two methods, one for the user to select one desired focus detection area from a plurality of detection areas, and one for estimating the main object from focus detection results from the plurality of focus detection areas and determining the focal length to use. Of these, the latter method has greater convenience, as the user can photograph without worrying about selecting a focus detection area. However, it has the problem that the automatically selected focus detection area does not necessarily detect the focus for the object which the user wishes to photograph.

One means of solving this is an image capturing apparatus constituted so as to detect a person's face in image data, set a focus detection area so as to include the detected face, and adjust the focus accordingly, in order to refine the precision of the estimation discussed above by limiting to humans. (See Japanese Patent Application Laid-Open No. 2003-107335.) Japanese Patent Application Laid-Open No. 2003-107335 describes an image capturing apparatus constituted so as to detect an object's face in image data, set a focus detection area so as to include the detected face, and adjust the focus accordingly, in order to refine the precision of the estimation discussed above by limiting to the faces of objects. In Japanese Patent Application Laid-Open No. 2003-107335, the focusing action is performed using a detected face, so the possibility of mistakenly focusing on other objects decreases.

However, with Japanese Patent Application Laid-Open No. 2003-107335, focus can sometimes be unadjusted in cases where the contrast of the face is low and sufficient focus detection data cannot be obtained, even though the face can be detected. Also, if objects such as flower vases at differing distances in the focus detection area are closer to the image capturing apparatus than a face, focus cannot be adjusted, even though a face can be detected.

SUMMARY OF THE INVENTION

Accordingly, the present invention was conceived with the above-mentioned problems in mind, and makes it possible to focus on the object intended by the user in a groundbreaking manner not possible with the conventional technology.

In order to solve these problems and attain the object, according to a first aspect of the present invention, a focus adjustment apparatus comprises a face position detection unit adapted to detect a position at which exists at least a face of a person in the frame using image signals obtained from image sensors which photoelectrically convert an object image captured by a photographing optical system, a focus control unit adapted to control the photographing optical system by referencing an in-focus position of the object image obtained in a focus detection area for detecting the focus state of the object image positioned in the frame, a control unit adapted to control the focus control unit to reference at least either an in-focus position obtained in a first focus detection area in which a person's face is present or an in-focus position obtained in a second focus detection area in which it is estimated that a person's body is present determining from the position of the person's face, and a determination unit adapted to determine the reliability with which the person's face can be focused on in the first focus detection area, the control unit controlling the focus control unit to reference either the in-focus position obtained in the first focus detection area or the in-focus position obtained in the second focus detection area based the determination results of the determination unit.

According to a second aspect of the present invention, a focus adjustment apparatus comprises a face position detection unit adapted to detect a position at which exists at least a face of a person in the frame using image signals obtained from image sensors which photoelectrically convert an object image captured by a photographing optical system, a focus control unit adapted to control the photographing optical system by referencing an in-focus position of the object image obtained in a focus detection area for detecting the focus state of the object image positioned in the frame, and a control unit adapted to control the focus control unit to reference at least either an in-focus position obtained in a first focus detection area in which a person's face is present or an in-focus position obtained in a second focus detection area in which it is estimated that a person's body is present determining from the position of the person's face, the control unit controlling the focus control unit to reference the in-focus position obtained in the first focus detection area if the difference between the in-focus position in the first focus detection area and the in-focus position in the second focus detection area is equal to or less than a pre-determined value.

According to a third aspect of the present invention, a focus adjustment apparatus comprises a face position detection unit adapted to detect a position at which exists at least a face of a person in the frame using image signals obtained from image sensors which photoelectrically convert an object image captured by a photographing optical system, a focus control unit adapted to control the photographing optical system by referencing an in-focus position of the object image obtained in a focus detection area for detecting the focus state of the object image positioned in the frame, a control unit adapted to control the focus control unit to reference at least either an in-focus position obtained in a first focus detection area in which a person's face is present or an in-focus position obtained in a second focus detection area in which it is estimated that a person's body is present determining from the position of the person's face, and a display unit for displaying an image obtained from the image sensors, the focus control unit focusing on and displaying the position of the face detected by the face position detection unit if the focus control unit controls the photographing optical system by referencing the in-focus position in either the first focus detection area or the second focus detection area.

According to a fourth aspect of the present invention, a focus adjustment method comprises a face position detection step of detecting a position at which exists at least a face of a person in the frame using image signals obtained from image sensors which photoelectrically convert an object image captured by a photographing optical system, a focus control step of controlling the photographing optical system by referencing an in-focus position of the object image obtained in a focus detection area for detecting the focus state of the object image positioned in the frame, a control step of controlling such that in the focus control step at least either an in-focus position obtained in a first focus detection area in which a person's face is present or an in-focus position obtained in a second focus detection area in which it is estimated that a person's body is present determining from the position of the person's face is referenced, and a determination step of determining the reliability with which the person's face can be focused on in the first focus detection area, the control step controlling such that the focus control step references either the in-focus position obtained in the first focus detection area or the in-focus position obtained in the second focus detection area based the determination results of the determination step.

According to a fifth aspect of the present invention, a focus adjustment method comprises a face position detection step of detecting a position at which exists at least a face of a person in the frame using image signals obtained from image sensors which photoelectrically convert an object image captured by a photographing optical system, a focus control step of controlling the photographing optical system by referencing an in-focus position of the object image obtained in a focus detection area for detecting the focus state of the object image positioned in the frame, and a control step of controlling such that in the focus control step at least either an in-focus position obtained in a first focus detection area in which a person's face is present or an in-focus position obtained in a second focus detection area in which it is estimated that a person's body is present determining from the position of the person's face is referenced, the control step controlling the focus control step to reference the in-focus position obtained in the first focus detection area if the difference between the in-focus position in the first focus detection area and the in-focus position in the second focus detection area is equal to or less than a pre-determined value.

According to a sixth aspect of the present invention, a focus adjustment method comprises a face position detection step of detecting a position at which exists at least a face of a person in the frame using image signals obtained from image sensors which photoelectrically convert an object image captured by a photographing optical system, a focus control step of controlling the photographing optical system by referencing an in-focus position of the object image obtained in a focus detection area for detecting the focus state of the object image positioned in the frame, a control step of controlling such that in the focus control step at least either an in-focus position obtained in a first focus detection area in which a person's face is present or an in-focus position obtained in a second focus detection area in which it is estimated that a person's body is present determining from the position of the person's face is referenced, and a display step of displaying an image obtained from the image sensors, the position of the face detected in the face position detection step being focused on and displayed in the focus control step if the focus control step controls the photographing optical system by referencing the in-focus position in either the first focus detection area or the second focus detection area.

According to a seventh aspect of the present invention, a focus adjustment apparatus comprises a face detection unit adapted to detect a position at which exists at least a face of an object using image signals obtained from image sensors which photoelectrically convert an object image captured by a photographing optical system, a focus detection unit adapted to detect a plurality of in-focus positions of the photographing optical system in a focus detection area in which it is estimated that the body is present corresponding to the face of the object detected by the face detection unit, and a control unit adapted to control movement of the photographing optical system based on at least one of the in-focus positions obtained in the focus detection area, the control unit controlling so as to move the photographing optical system to the in-focus position corresponding to the farthest distance, from among the plurality of in-focus positions detected by the focus detection unit.

According to an eighth aspect of the present invention, a focus adjustment apparatus comprises a face detection unit adapted to detect face information of an object using image signals obtained by photoelectrically converting an object image captured by a photographing optical system, an estimation unit adapted to estimate the object distance from the face information detected by the face detection unit, a focus detection unit for detecting an in-focus position of the photographing optical system based on the image signals, and a control unit adapted to control so as to move the photographing optical system to the detected in-focus position, the control unit selecting the in-focus position to which to move the photographing optical system from among a plurality of in-focus positions based on the estimated object distance if a plurality of in-focus positions are detected.

According to a ninth aspect of the present invention, a control method of a focus adjustment apparatus comprises a face detection step of detecting a position at which exists at least a face of an object using image signals obtained by photoelectrically converting an object image captured by a photographing optical system, a focus detection step of detecting a plurality of in-focus positions of the photographing optical system in a focus detection area in which it is estimated that the body is present corresponding to the face of the object detected in the face detection step, and a control step of controlling movement of the photographing optical system based on at least one of the in-focus positions obtained in the focus detection area, the control step controlling so as to move the photographing optical system to the in-focus position corresponding to the farthest distance, from among the plurality of in-focus positions detected in the focus detection step.

According to a tenth aspect of the present invention, a control method of a focus adjustment apparatus comprises a face detection step of detecting face information of an object using image signals obtained by photoelectrically converting an object image captured by a photographing optical system, an estimation step of estimating the object distance from the face information detected in the face detection step, a focus detection step of detecting an in-focus position of the photographing optical system based on the image signals, and a control step of controlling so as to move the photographing optical system to the detected in-focus position, the control unit selecting the in-focus position to which to move the photographing optical system from among a plurality of in-focus positions based on the estimated object distance if a plurality of in-focus positions are detected.

According to an 11th aspect of the present invention, a focus adjustment apparatus comprises a face position detection unit adapted to detect a position at which exists at least a face of a person in a frame using an image signal obtained from an image sensor which photoelectrically converts an object image captured by a photographing optical system, a focus detection unit adapted to detect an in-focus position of the photographing optical system in at least one of a first focus detection area in which the person's face detected by the face position detection unit is present and a second focus detection area in which it is estimated that the person's body corresponding to the person's face detected by the face position detection unit is present, and a control unit adapted to control a movement of the photographing optical system based on at least one of in-focus positions obtained from the first and second focus detection areas, wherein the second focus detection area is larger than the first focus detection area.

Further features of the present invention will become apparent from the following description of exemplary embodiments (with reference to the attached drawings).

DESCRIPTION OF THE EMBODIMENTS

Below follows a detailed description of preferred embodiments of the present invention with reference to the attached drawings.

First Embodiment

Figure 1:
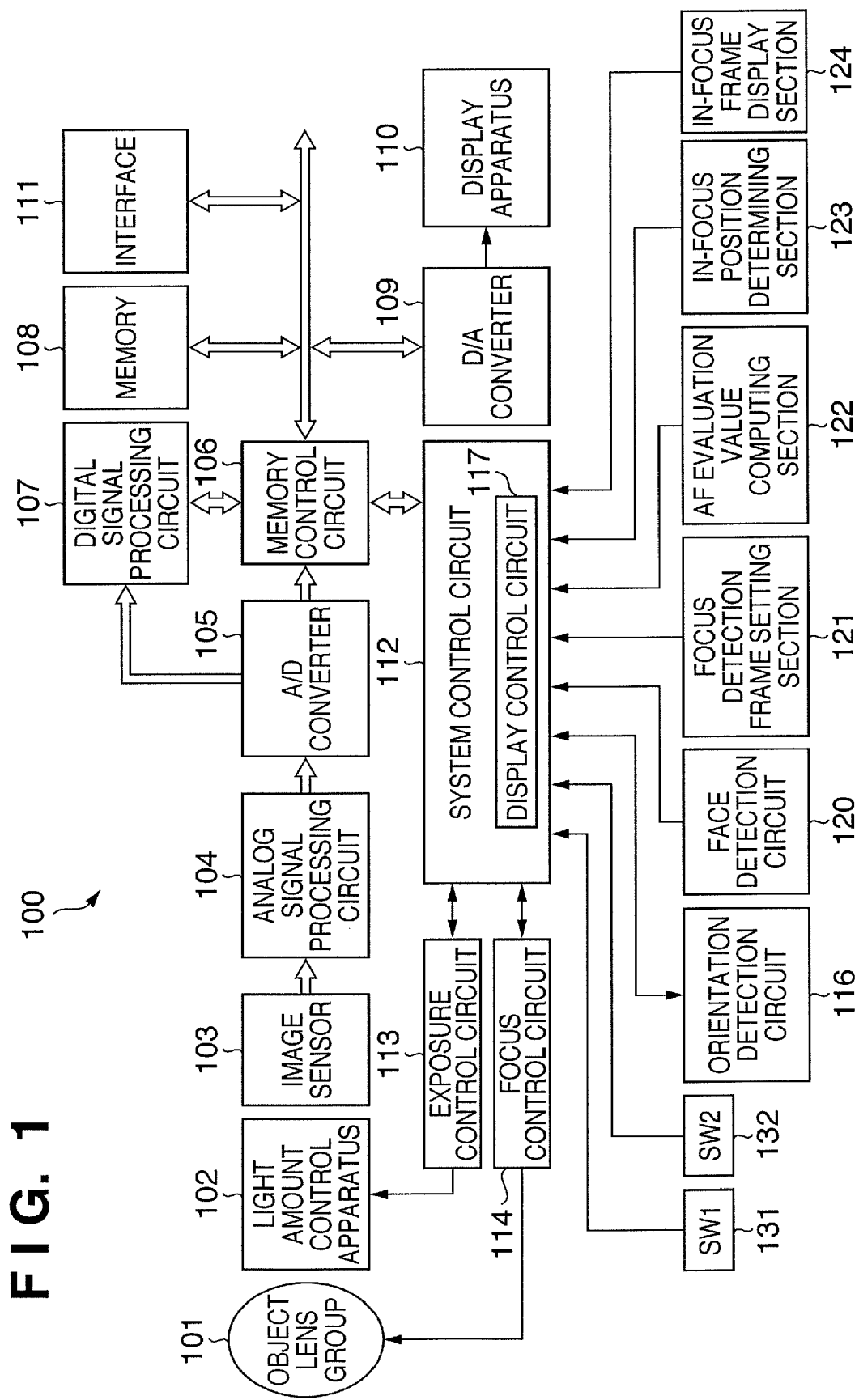
FIG. 1 is a block diagram showing a constitution of a digital camera according to a first embodiment of the present invention.

FIG. 1 is a block diagram showing a configuration of an image capturing apparatus 100 for performing auto focus using a face detection function according to a first embodiment of the present invention. In the present embodiment, a digital camera is used as an example for description.

In FIG. 1, reference numeral 101 is an object lens group for capturing an object image on an image sensor 103 described below, and reference numeral 102 is a light amount adjustment apparatus provided with an aperture stop apparatus and a shutter apparatus. Reference numeral 103 is a CCD, CMOS, or other type of image sensor for converting an object image captured by the object lens group 101 into an electric signal. Reference numeral 104 is an analog signal processing circuit for performing such processes as clamping and gaining on the analog signal output of the image sensor 103. Reference numeral 105 is an analog/digital (hereafter "A/D") converter for converting output of the analog signal processing circuit 104 into a digital signal. The data output from the A/D converter 105 passes through a digital signal processing circuit 107 and a memory control circuit 106, or directly through a memory control circuit 106, described below, and is written to a memory 108.

Reference numeral 107 is the digital signal processing circuit which performs processes such as pixel interpolation and color conversion on the data from the A/D converter 105 or the memory control circuit 106. The digital signal processing circuit 107 uses the data from the A/D converter 105 to compute a brightness value or a value expressing the focus state of an object, as well as to adjust white balance.

A system control circuit 112 executes control over an exposure control circuit 113 and a focus control circuit 114 based on the computation results of the digital signal processing circuit 107. Specifically, it performs a focus control process, an exposure control process, and a light adjustment process using an object image passing through the object lens group 101. The system control circuit 112 has a display control circuit 117 for controlling the display of a display apparatus 110.

The memory control circuit 106 controls the analog signal processing circuit 104, the A/D converter 105, the digital signal processing circuit 107, the memory 108, and a digital/analog (hereafter "D/A") converter 109. Data undergoing A/D conversion in the A/D converter 105 passes through the digital signal processing circuit 107 and the memory control circuit 106, or data undergoing A/D conversion in the A/D converter 105 directly passes through the memory control circuit 106, and is written to the memory 108.

Data displayed to the display apparatus 110 is written to the memory 108, and the data written to the memory 108 is displayed in the display apparatus 110 described below via the D/A converter 109. The memory 108 stores captured still images or moving images. The memory 108 can also be used as a work area for the system control circuit 112.

Reference numeral 110 is the display apparatus made up of a liquid crystal monitor for displaying images generated from image data obtained through photography, and functions as an electronic finder if object images obtained using the image sensor 103 are displayed in sequence. The display apparatus 110 can turn display on and off arbitrarily as commanded by the system control circuit 112, the power consumption of the image capturing apparatus 100 being lower when display is turned off as compared with when display is on. The display apparatus 110 displays operating statuses of the image capturing apparatus 100, messages, and the like using characters, images, and the like as commanded by the system control circuit 112.

Reference numeral 111 is an interface for exchanging image data and management information pertaining to the image data with memory cards, hard disks, and other external storage media, as well as with peripheral devices such as computers and printers. The interface 111 may be connected directly to various types of communications cards if constituted in compliance with standards such as for PCMCIA cards, CF (Compact Flash™) cards, and so on. Such communication cards include LAN cards, modem cards, USB cards, IEEE 1394 cards, P1284 cards, SCSI cards, PHS and other communication cards, and so on.

Reference numeral 116 is an orientation detection circuit which detects the orientation of the image capturing apparatus 100 and outputs the detection results to the system control circuit 112.

The system control circuit 112 controls overall operation of the image capturing apparatus 100. A memory (not shown) inside the system control circuit 112 stores constants, variables, programs, and the like for operation of the system control circuit 112.

The exposure control circuit 113 drives the aperture stop apparatus and the shutter apparatus of the light amount control apparatus 102. The focus control circuit 114 drives a focusing lens and a zoom lens in the object lens group 101.

An auto focus operation is controlled by the system control circuit 112 and the focus control circuit 114. First, a face position is detected by a face detection circuit 120. The face detection circuit 120 registers feature data of human faces ahead of time, and recognizes human faces in image data by comparing with the feature data. In the present embodiment, the face detection circuit 120 detects human faces by detecting feature portions of a face, such as eyes and a mouth which are registered as feature data, in the data from the A/D converter 105 or the data written to the memory 108. In this case, the position of the face and size information are obtained.

Next, a focus detection frame is set as described below by a focus detection frame setting section 121, and the focus lens in the object lens group 101 is driven by the focus control circuit 114. While moving the focus lens, an AF evaluation value computing section 122 computes a signal corresponding to the contrast of the image using image signals captured in each of a plurality of focus detection areas. Next, an in-focus position determining section 123 determines an in-focus position and the focus lens is controlled and driven to that position, and an in-focus frame is displayed by an in-focus frame display section 124. When a switch SW1 (131), which turns on when a release button is pressed halfway, is operated, the focus operation is performed, and when a switch SW2 (132), which turns on when the release button is fully pressed, is operated, the image is captured and stored.

Computation of the AF evaluation value is performed as follows. A horizontal band pass filter is applied to each line in the image data inside the focus detection frame. Next, for each line, the band pass output signal with the largest absolute value is selected. The selected signals are vertically integrated. Through this process, the largest horizontal contrast is detected, and by performing vertical integration, a signal with an improved S/N ratio is obtained. This signal has the largest value when in-focus, and an increasingly smaller value as the image becomes defocused. Accordingly, an in-focus image can be obtained by detecting the maximum value position for the signal and photographing at that position.

Below, the main operation of the image capturing apparatus of the present embodiment is described, with reference to the flow charts in FIGS. 2A and 2B. Note that the program for executing this process is stored in the memory of the system control circuit 112, and is executed under the control of the system control circuit 112.

Figure 2A:
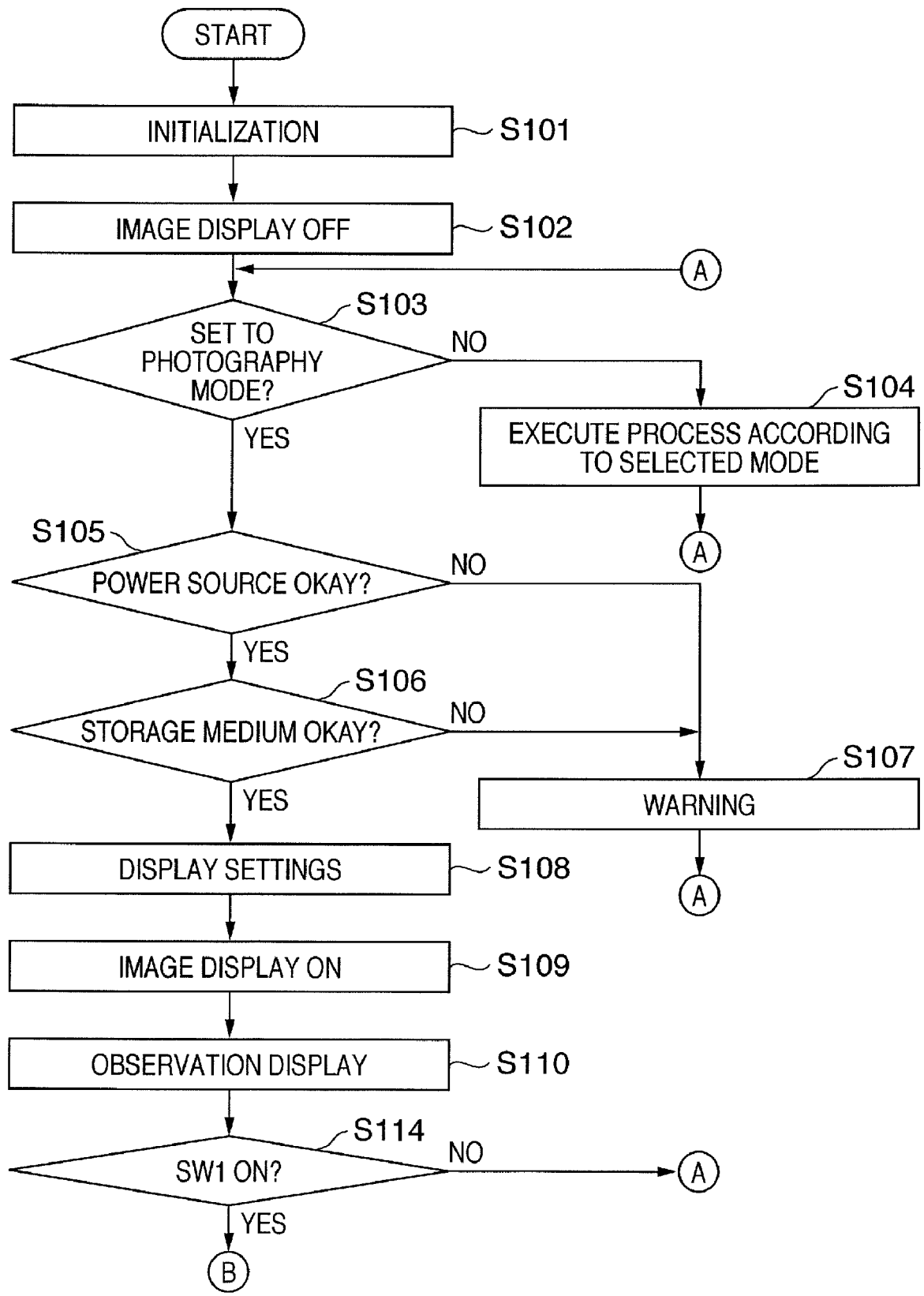
FIGS. 2A and 2B are flow charts showing overall operation of a digital camera of the first embodiment.
Figure 2B:
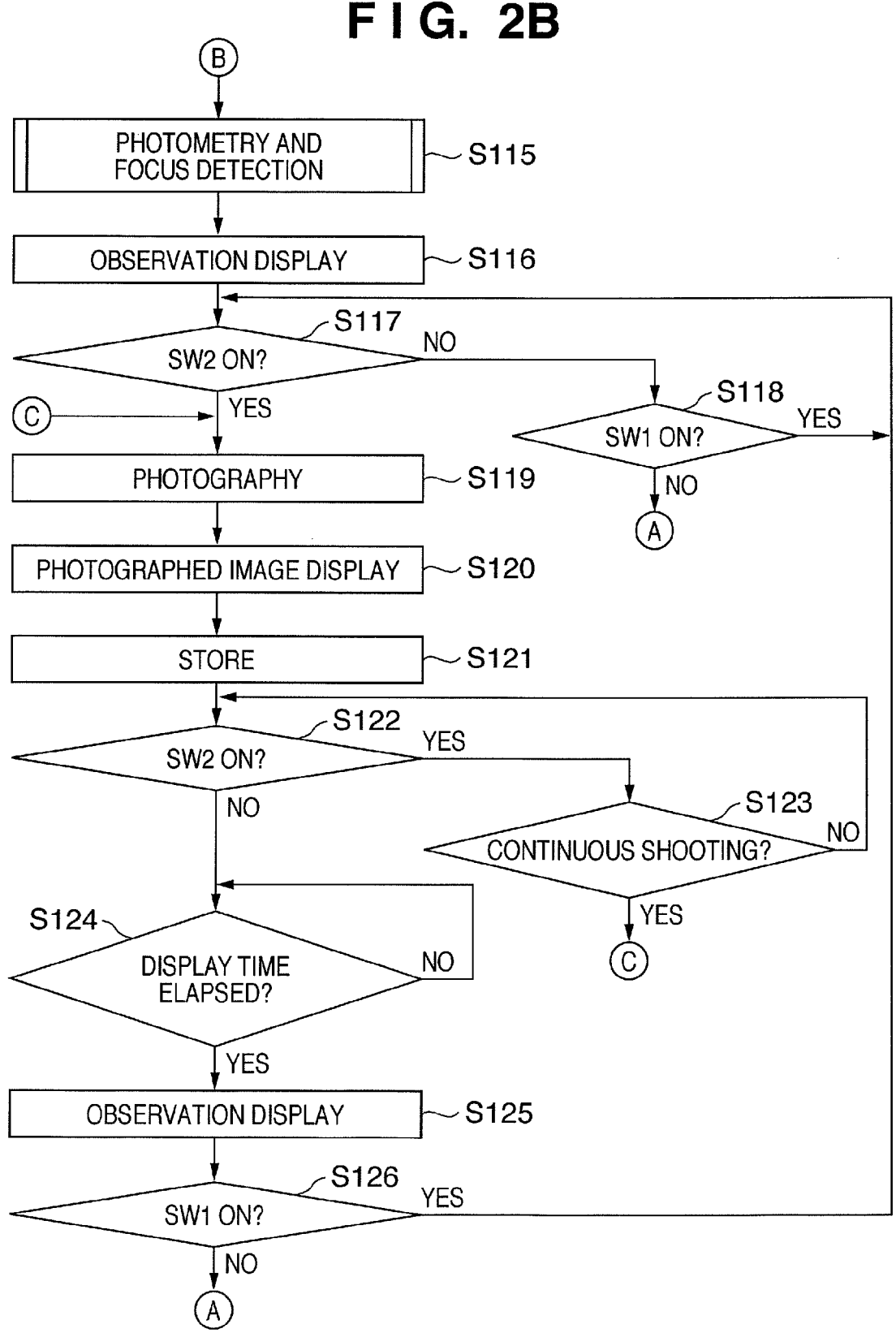

FIGS. 2A and 2B are flow charts for describing operation during a main process in the image capturing apparatus 100 according to the present embodiment.

This process is begun after the power is turned on, for example, after replacement of the batteries, and in step S101 the system control circuit 112 initializes various flags and control variables, etc., in the internal memory.

In step S102, the system control circuit 112 makes the default setting of the image display in the display apparatus 110 off.

In step S103, the system control circuit 112 detects whether or not a photography mode has been selected in which settings are made for photographing and storing image data by the image capturing apparatus 100. If no photography mode is set, the process moves to step S104. In step S104, the system control circuit 112 executes a process according to a selected mode different from the photography mode, and returns to step S103 after that process is finished.

The system control circuit 112 moves to step S105 if a photography mode was set in step S103, and determines whether or not the remaining power or the operating condition of the power source presents a problem for the operation of the image capturing apparatus 100. The system control circuit 112 moves to step S107 if it determines that there is a problem, displays a prescribed warning via an image or audio using the display apparatus 110, and then returns to step S103.

In step S105, the system control circuit 112 moves to step S106 if it determines that there is no problem with the power source. In step S106 the system control circuit 112 determines whether or not the operating condition of the storage medium presents a problem for the operation of the image capturing apparatus 100, in particular the recording/playback operation of data to/from the storage medium. The system control circuit 112 moves to step S107 described above if it determines that there is a problem, displays a prescribed warning via an image or audio using the display apparatus 110, and then returns to step S103.

The system control circuit 112 moves to step S108 if it determines that there is no problem in step S106. In step S108, the system control circuit 112 displays a user interface (hereafter "UI") of the settings of the image capturing apparatus 100 via an image or audio, using the display apparatus 110. Note that if the image display of the display apparatus 110 was on, the UI display of the various settings of the image capturing apparatus 100 via images or audio could be done using the display apparatus 110. Settings are thus made by the user.

Next, in step S109, the system control circuit 112 sets the image display of the display apparatus 110 to on.

Further, in step S110, the system control circuit 112 sets the image capturing apparatus 100 to observation display mode so that images generated based on image data obtained by the image sensor 103 are sequentially displayed. In observation display mode, the data sequentially written to the memory 108 is sequentially displayed to the display apparatus 110, and the display apparatus 110 thereby functions as an electronic finder.

In step S114, the system control circuit 112 checks if the shutter switch SW1 is pressed or not, and returns to step S103 if it is not, and moves to step S115 if the shutter switch SW1 is pressed.

In step S115, the system control circuit 112 causes the exposure control circuit 113 to perform exposure control such that the brightness value of the frame is correct. If needed, a flash apparatus (not shown) can be caused to flash during photography, according to the results of the exposure control at this time. Further, the focus control circuit 114 is caused to perform focus control such that the area in which a human face is present is in focus.

In step S116, the system control circuit 112 maintains observation display mode until the shutter switch SW2 is operated.

Next, in step S117, if it is detected that the shutter switch SW1 is released without the shutter switch SW2 being pressed, the process returns to step S103.

On the other hand, if the shutter switch SW2 is pressed in step S117, the process moves to step S119.

In step S119, the system control circuit 112 performs a photography process for writing captured image data to the memory 108. The exposure control circuit 113 drives the aperture stop apparatus according to the exposure control results in step S115, and exposes the image sensor 103 by opening the shutter. The flash apparatus is caused to flash as needed, and the shutter is closed once the set exposure time has elapsed. The charge signal output from the image sensor 103 is written to the memory 108 as image data for saving, via the A/D converter 105, the digital signal processing circuit 107, and the memory control circuit 106. The system control circuit 112 further uses the memory control circuit 106 and the digital signal processing circuit 107 to read the image data for saving written to the memory 108 and to execute a vertical add process. The digital signal processing circuit 107 in turn is caused to perform a color process, and image data for display is generated and once again written to the memory 108.

In step S120, the display apparatus 110 displays the photographed image using the image data for display obtained in step S119.

In step S121, the system control circuit 112 reads the image data for saving written to the memory 108 and causes the memory control circuit 106 and, if needed, the digital signal processing circuit 107 to perform various image processes. The system control circuit 112 then performs an image compression process, and executes a storage process for writing the compressed image data for saving to a storage medium.

Once the storage process in step S121 is finished, in step S122 the system control circuit 112 checks whether or not the shutter switch SW2 is pressed. If the shutter switch SW2 is in a pressed state, the process moves to step S123, and the system control circuit 112 determines the state of the continuous shooting flag stored in the internal memory of the system control circuit 112 or the memory 108. If the continuous shooting flag is on, the system control circuit 112 moves to step S119 in order to perform image capturing continuously, and captures the next image. In step S123, if the continuous shooting flag is not on, the system control circuit 112 moves to step S122, and repeats the processes of steps S122 and S123 until the shutter switch SW2 is turned off.

After the storage process of step S121, if the shutter switch SW2 is off, the process moves from step S122 to step S124. In step S124, the process waits until the set display time for the photographed image elapsed before moving to step S125.

In step S125, the system control circuit 112 sets the display apparatus 110 to observation display mode and moves to step S126. Thus is it possible to set observation display mode for the next photographing after confirming the image photographed in the display apparatus 110.

In step S126, the system control circuit 112 checks whether or not the shutter switch SW1 is in an on state, and if it is, moves to step S117 and prepares for the next image capture. In step S126, if the shutter switch SW1 is off, the process moves to step S103 after finishing the series of image capturing operations.

Figure 3:
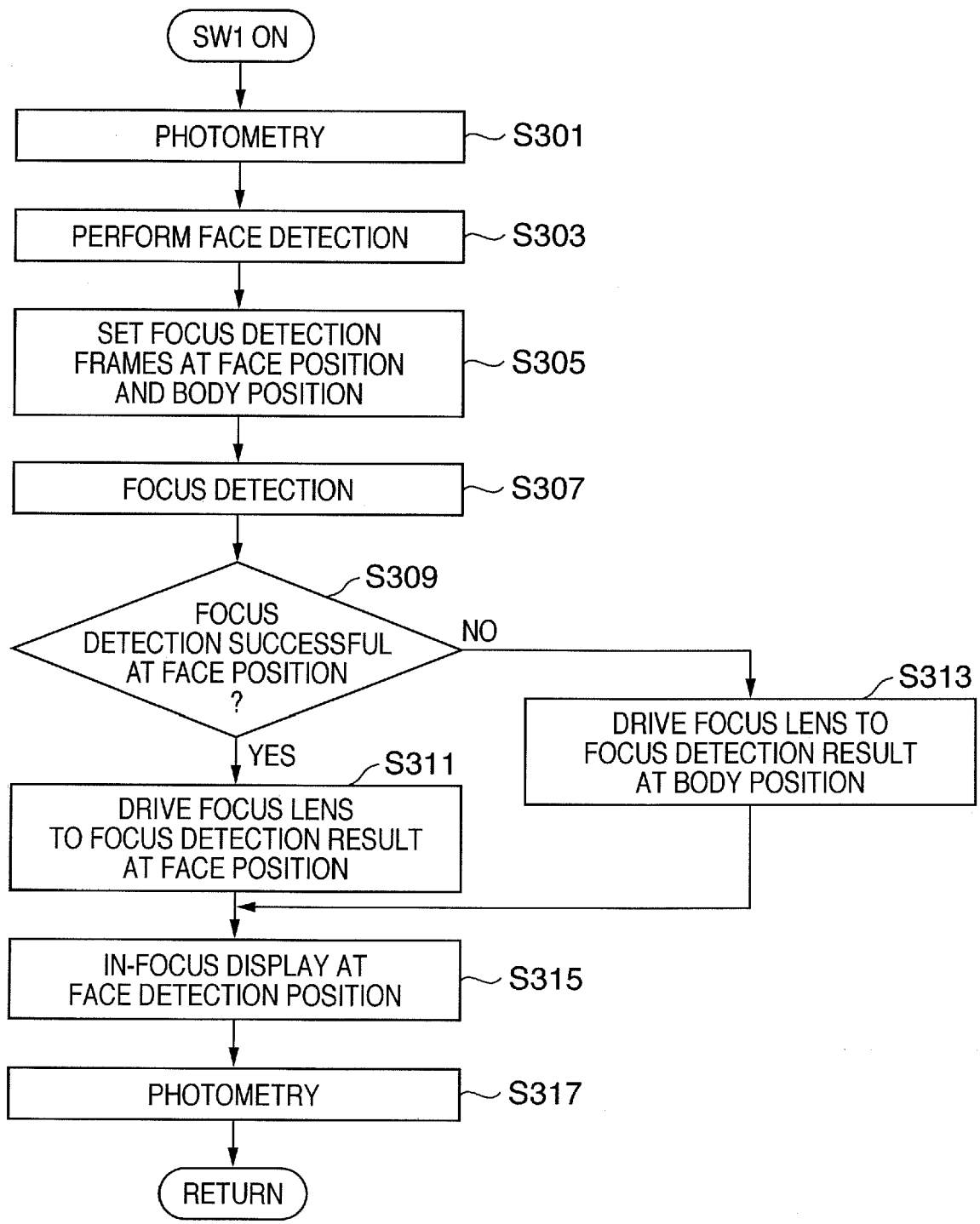
FIG. 3 is a flow chart showing details of the photometry and focus detection routine in FIGS. 2A and 2B.

Next, FIG. 3 is a flow chart showing details of the photometry and focus detection routine of step S115 in FIG. 2B.

First, when the shutter switch SW1 is turned on in step S114 of FIG. 2A, the system control circuit 112 causes the exposure control circuit 113 in step S301 to perform exposure control such that the brightness value in the frame is correct.

Next, in step S303, the face detection circuit 120 performs detection of human faces. Many methods are publicly known as technologies for detecting faces. For example, there are methods which use learning, of which neural networks is one typical example. There are also methods for recognizing parts having features of physical shapes such as the eyes, the nose, the mouth, and the profile of the face using template matching in the image data. Besides these, there are methods which detect the amount of features in image data such as skin color and the shape of the eyes and use statistical analysis. (See, for example, Japanese Patent Application Laid-Open No. H10-232934 or Japanese Patent Application Laid-Open No. 2000-48184, etc.) Further, there are methods for determining whether or not the immediately preceding face area is near the detected area, determining the colors near the face area in order to add the color of the clothes, or setting the threshold for recognizing faces lower for the position closer to the center of the frame. There are also methods for designating ahead of time the area where the main object is present, storing the histogram and color information, and tracking the main object by finding the correlation value. In the present embodiment, a face recognition process is performed using a method for detecting a pair of eyes, a nose, a mouth, and the profile of a face, and determining a human face based on the relative positions thereof. Moreover, it is also possible to detect the human face periodically from before the SW1 is turned on, and read the most recent face detection results once the SW1 is turned on.

Next, in step S305, the focus detection frame setting section 121 sets a focus detection frame at the position of the body estimated from the position of the detected face and the face size. For example, in FIG. 4, the position and size of the face obtained from the face detection circuit can be applied as the AF frame as-is for the position of the face. As regards the position of the body, assuming there is a body below the face, the frame can be set at the same size as the size of the face frame, immediately below the face frame. Moreover, while the body is normally positioned below the position of the face, determining which way is down with regard to the position of the face is done by detecting the orientation of the image capturing apparatus using the orientation detection circuit 116 shown in FIG. 1. Alternately, the tilt of the face in the frame can be detected, thereafter detecting in which direction the body is positioned. The focus detection frame for the position of the body is set so as not to overlap with the focus detection frame of the face. One reason for failure to detect focus at the position of the face is that a large portion of the area of the position of the face is taken up by skin color, which has a low difference in brightness values, which means that an AF evaluation value cannot be obtained which has high reliability, as discussed below. If the focus detection frame is set at the position of the torso (body), avoiding the position of the face, the possibility rises of obtaining an AF evaluation value with high reliability, although it depends on the pattern of the clothes. Also, if not one but a plurality of focus detection frames are set for the position of the body, it is possible to raise the possibility of obtaining a focus detection frame which will successfully detect the focus.

In step S307, the AF evaluation value computing section 122 detects the focus of the focus detection frames.

Next, in step S309, the in-focus position determining section 123 determines whether or not focus was successfully detected in the face position frame, and if so the focus control circuit 114 drives the focus lens in step S311 by referencing the in-focus position at the face position. If focus is not detected successfully, the focus control circuit 114 drives the focus lens in step S313 by referencing the in-focus position of the body position frame. If focus is not successfully detected even at the position of the body, the focus lens is driven to the default position. If focus is successfully detected at both the frame for the face position and the frame for the body position, the focus lens may be driven, taking into account both in-focus positions. Note that the determination of whether focus can be detected or not can be done, for example, by determining whether or not the difference between minimum and maximum values of the AF evaluation value during focus detection are equal to or greater than a prescribed value. This is discussed in greater detail below.

Moreover, if a plurality of faces is detected in the frame, focus detection is performed for each face and body.

Figure 4:
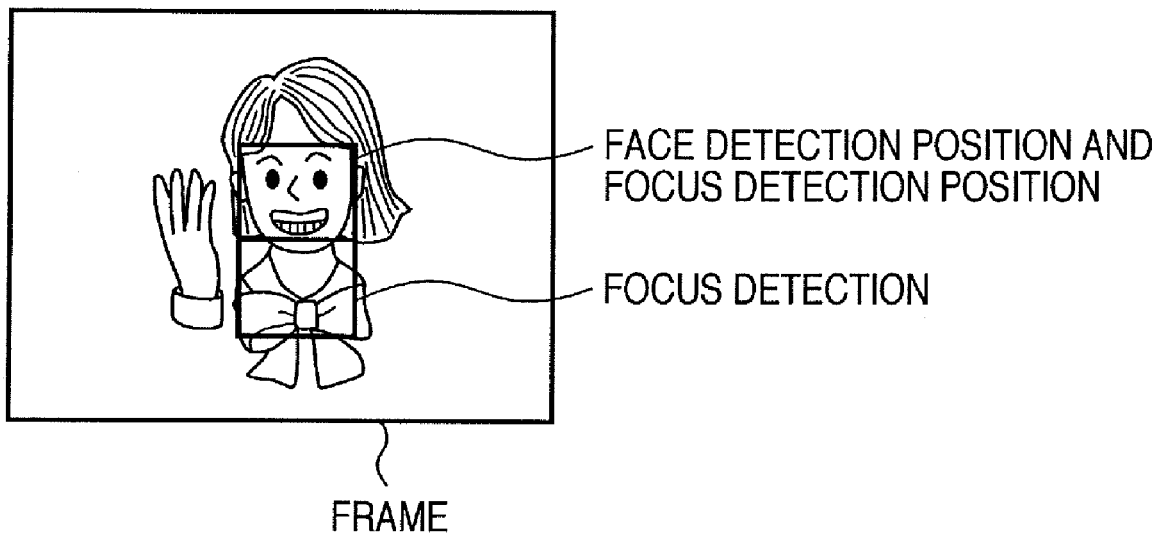
FIG. 4 is a view showing an example of a focus detection frame.

After driving the focus lens, in step S315 the in-focus frame display section 124 displays the in-focus display frame on the face detection position as shown in FIG. 4. In the case of a camera equipped with a face detection function, if a face is successfully detected and it is determined that a person can be focused on, an in-focus display on the face position makes it easier for the user to understand that the person is focused on than an in-focus display on the position actually measured by distance (to the body, etc.). It is also possible to display a display different from the focus detection frame for the face position to a part of the body of the person, in order to make it clear to the user that the body of the person is focused on.

Next, in step S317, focused on the object, the system control circuit 112 once again causes the exposure control circuit 113 to perform exposure control such that the brightness value of the frame is correct. Then the system control circuit 112 returns to the main routine in FIGS. 2A and 2B.

Next, a method is described for determining whether or not focus was successfully detected in step S309 of FIG. 3.

Figure 5:
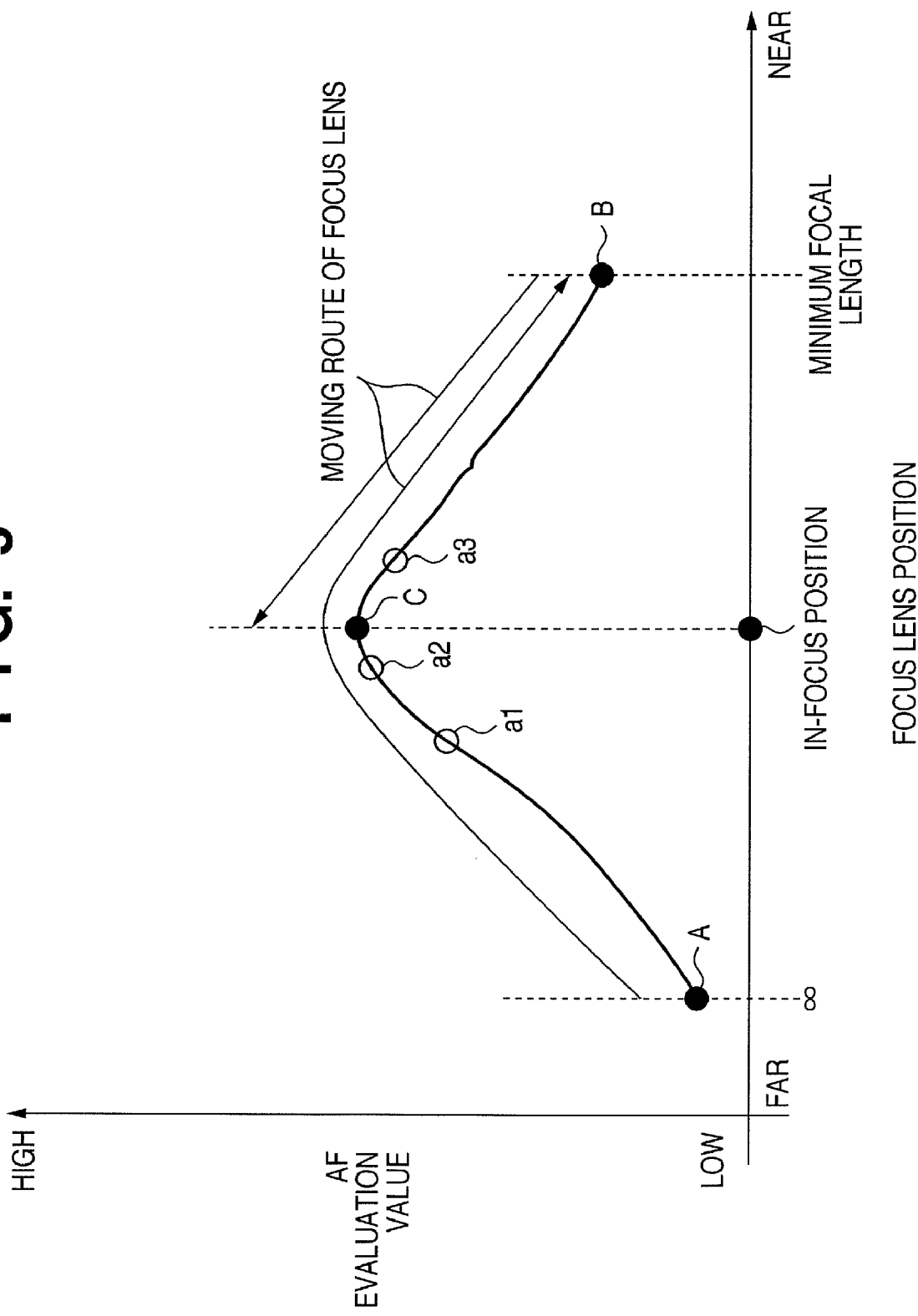
FIG. 5 is a view showing one example of a relationship between a focus lens position and an AF evaluation value signal.

In step S307 of FIG. 3, the system control circuit 112 performs a scanning AF (auto focus) process in order to detect the in-focus position. A summary of this is given using FIG. 5. Scanning AF is performed by obtaining the position of the focus lens at which the high-frequency component output by the image signal generated by the image sensor 103 is highest. The system control circuit 112 moves the focus lens from the position equivalent to a maximum focal length ("A" in FIG. 5) to the position equivalent to a minimum focal length ("B" in FIG. 5) set in each photography mode. While driving the focus lens, the output from the AF evaluation value computing section 122 (the AF evaluation value signal) is obtained, the position at which it is highest ("C" in FIG. 5) is obtained from the AF evaluation value signal obtained once the driving of the focus lens is finished, and the focus lens is driven to that position.

Obtaining the output of the AF evaluation value computing section 122 is not performed at all stopped positions of the focus lens in order to speed up the scanning AF process, and is only performed at prescribed steps. In this case, the AF evaluation value signal is obtained at points a1, a2, and a3 shown in FIG. 5. In this case, the in-focus position C is obtained by calculation based on the point at which the AF evaluation value signal is highest and points before and after it. Moreover, the focus lens positions at which the AF evaluation value signal is obtained at each prescribed step shall henceforth be known as "scan points," the scan point at maximum focal length being 0, and the scan point at the minimum focal length being N in the present embodiment.

In the present embodiment, before performing interpolation and obtaining the point at which the AF evaluation value signal is highest (C in FIG. 5), the reliability of the AF evaluation value signal is evaluated. If the reliability is sufficient, then the point at which the AF evaluation value signal is highest is obtained, and in-focus detection is determined to have succeeded.

If, as a result of evaluating the reliability of the AF evaluation value signal, the reliability is low, the process to obtain the point at which the AF evaluation value signal is highest is not performed, and in-focus detection is determined not to have been successful.

Next, a method for determining the reliability of the AF evaluation value signal in the scanning AF process is described in detail.

Figure 6:
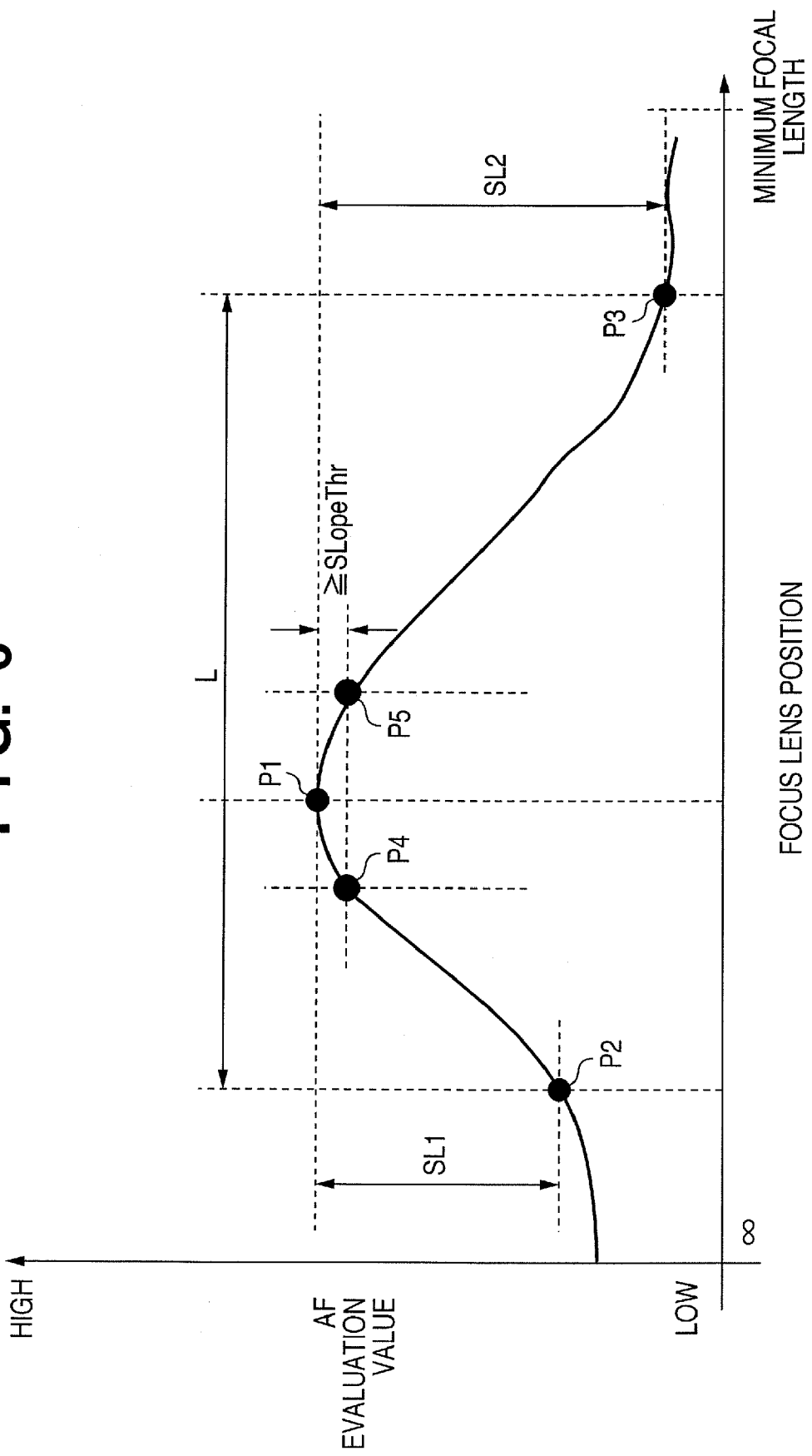
FIG. 6 is a view for explaining the concept of reliability determination of an AF evaluation value signal.

Aside from special cases of maximum and minimum focal lengths conflicting, the AF evaluation value signal has a hill shape as shown in FIG. 6, with distance along the horizontal axis and the AF evaluation value along the vertical axis. Accordingly, in the present embodiment, the reliability of the AF evaluation value signal is determined by determining whether or not the AF evaluation value signal has a hill shape, taking account of the difference between the minimum and maximum values of the AF evaluation value signal, the length of portions sloping at a slope equal to or greater than a certain fixed value, and the slope of the sloping portions.

As shown in FIG. 6, in the present embodiment, point P2 and point P3 found to slope from the top of the hill (point P1) are obtained, the width between point P2 and point P3 is the width of the hill L, and the sum of the difference SL1 between the AF evaluation values at point P1 and point P2 and the difference SL2 between the AF evaluation values at point P1 and P3 (i.e., SL1+SL2) is the height SL of the hill.

Figure 7:
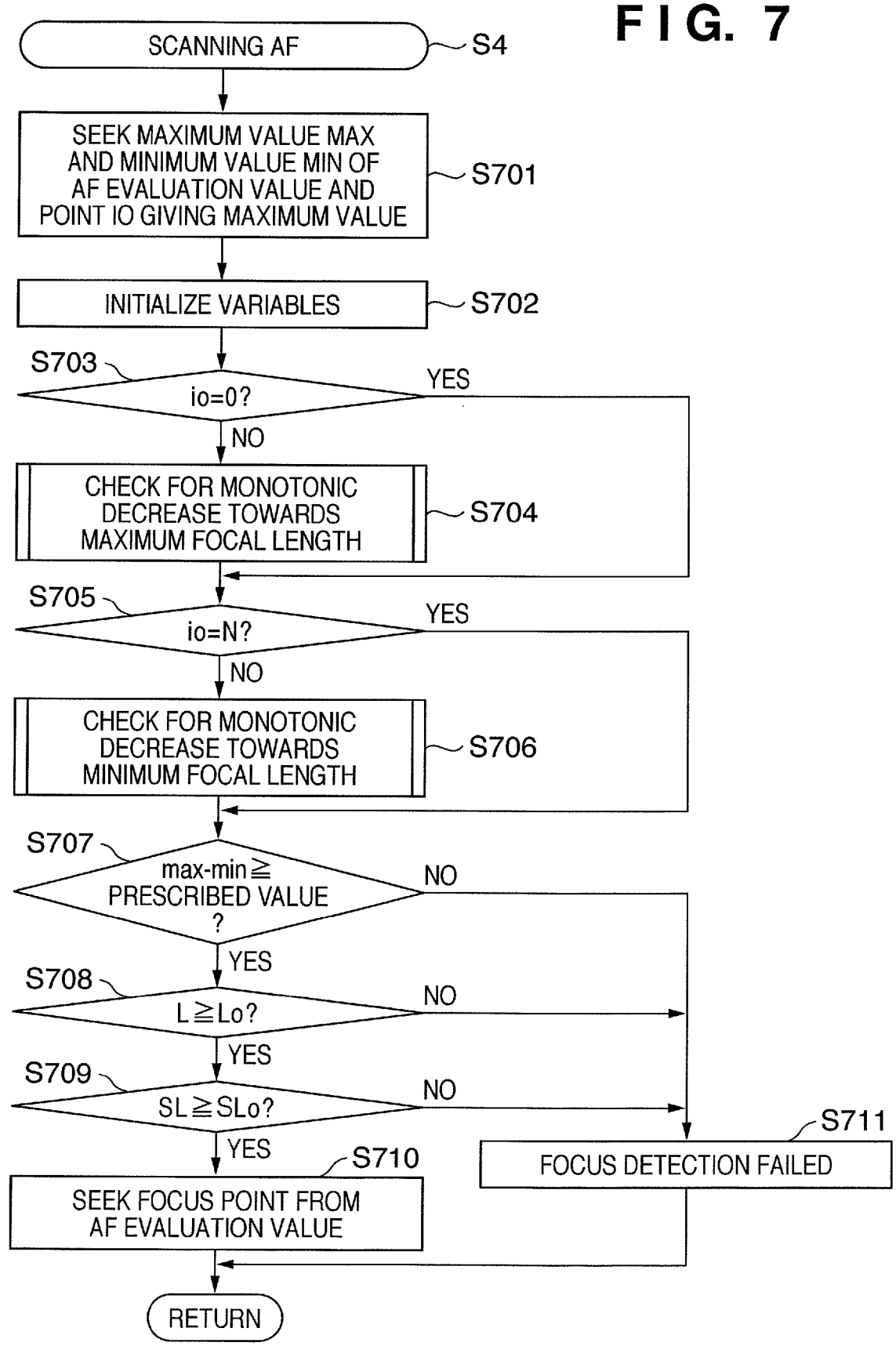
FIG. 7 is a flow chart showing an AF procedure in the first embodiment.

Below, a description is given of specific operations for determining the reliability of the AF evaluation value signal according to the flow chart in FIGS. 7-9, with reference to FIG. 6.

First, in step S701, the maximum value max and the minimum value min of the AF evaluation value output from the AF evaluation value computing section 122, and the scan point io giving the maximum value are obtained. In step S702, the variable L expressing the width of the hill of the AF evaluation value and the variable SL expressing the height of the hill are both initialized to 0.

Next, the scan point io giving the maximum value is checked to see whether or not it is at a position equivalent to the maximum focal length, or in other words, to see whether or not io=0, and if it is at a position equivalent to the maximum focal length ("yes" in step S703), step S704 is skipped, and the process moves to step S705. On the other hand, if it is not at a position equivalent to the maximum focal length ("no" in step S703), the process moves to step S704, and the monotonic decrease towards the focus lens position equivalent to maximum focal length is checked.

Figure 8:
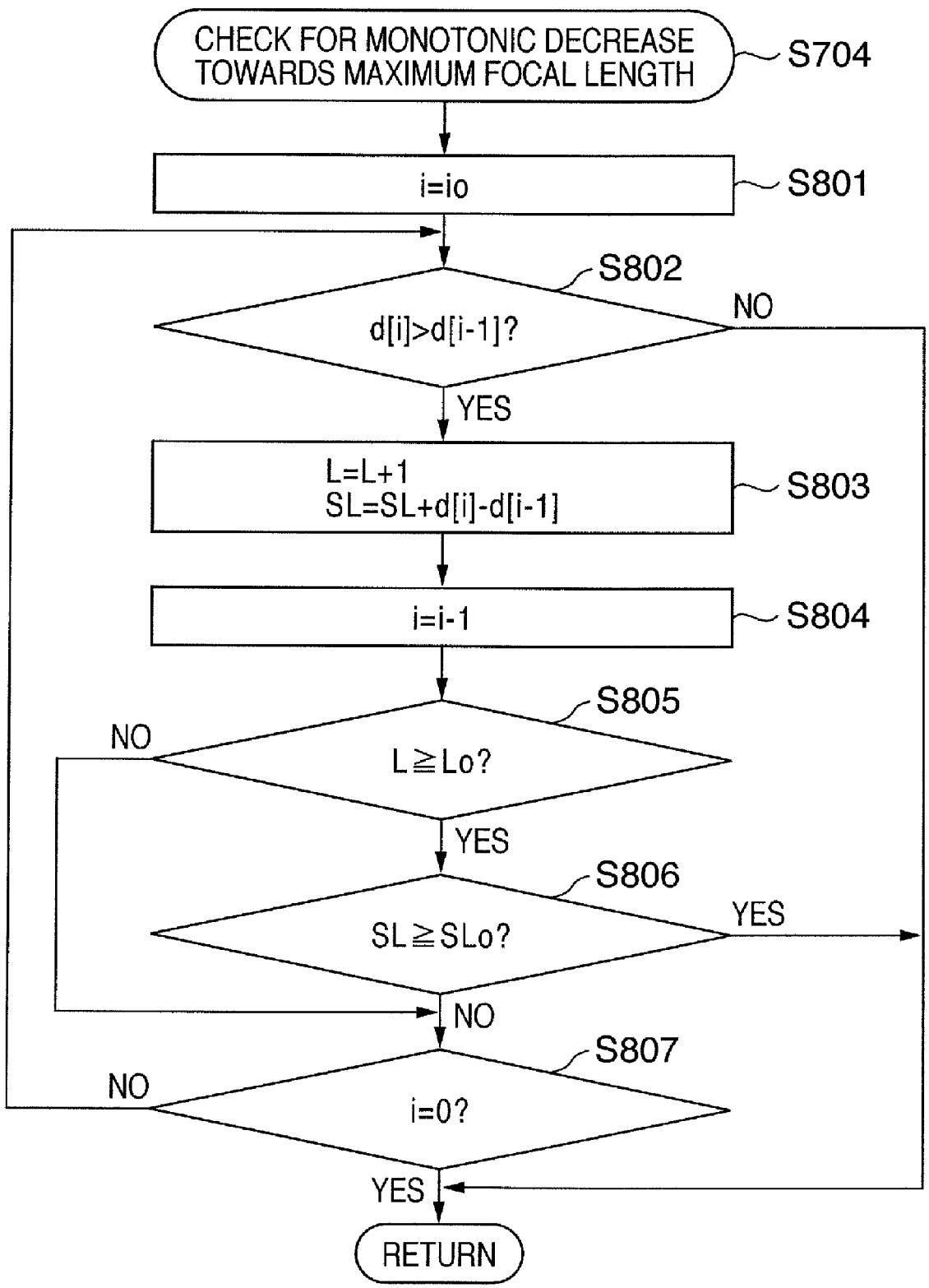
FIG. 8 is a flow chart for describing operations related to confirming monotonic decrease towards the maximum focal length.

Now the process for checking the monotonic decrease towards the focus lens position equivalent to maximum focal length in step S704 is described, with reference to the flow chart in FIG. 8.

First, in step S801, a counter variable i is initialized to io. Then a value d[i] of the AF evaluation value is compared with a value d[i−1] of the AF evaluation value at scan point i−1 closer to the maximum focal length by one scan point from i (a prescribed step). If d[i] is larger than d[i−1], ('yes' in step S802), monotonic decrease towards the maximum focal length is determined as occurring, the process moves to step S803, and the variable L expressing the width of the hill of the AF evaluation value and the variable SL expressing the height of the hill are updated according to the following formulas.

$$L=L+1$$

$$SL=SL+(d[i]-d[i-1])$$

Then in step S802, if d[i]>d[i−1] does not hold true, it is determined that monotonic decrease towards the maximum focal length is not occurring, the process for checking monotonic decrease towards the maximum focal length is finished, and the process moves to step S705.

After the process in step S803, the process moves to step S804, in which i=i−1, and the point for detection is moved towards the maximum focal length by one scan point.

In steps S805 and S806, L and SL are compared with threshold values Lo and SLo related to the width and height of the hill for deeming that it is a hill, and determined whether or not they are equal to or greater than the threshold values. If they are both equal to or greater than the threshold values, the conditions in the process for determining the reliability of the AF evaluation value performed in steps S708 and S709 in FIG. 7, discussed below, are already met, so the process for checking monotonic decrease towards the maximum focal length is not performed, and the process moves to step S705.

In the case of "no" in step S805 or S806, the process moves to step S807, and the counter i is checked to see whether or not it has reached a value equivalent to the maximum focal length (=0). If the value of the counter is not 0, then the process returns to step S802 and the above processes are repeated. If it is 0, or in other words, if the scan point has reached the position of the maximum focal length, the process for checking for monotonic decrease towards the maximum focal length is finished, and the process moves to step S705.

Thus, monotonic decrease towards the maximum focal length is checked from i=io.

If the process for checking for monotonic decrease towards the maximum focal length finished in step S704, next the scan point io giving the maximum value max is checked to see whether it is at a position equivalent to the minimum focal length (N) for performing scanning AF, and if it is at a position equivalent to the minimum focal length ("yes" in step S705), then step S706 is skipped, and the process moves to step S707. On the other hand, if it is not at a position equivalent to the minimum focal length ("no" in step S705), the process moves to step S706, and the monotonic decrease towards the focus lens position equivalent to minimum focal length is checked.

Figure 9:
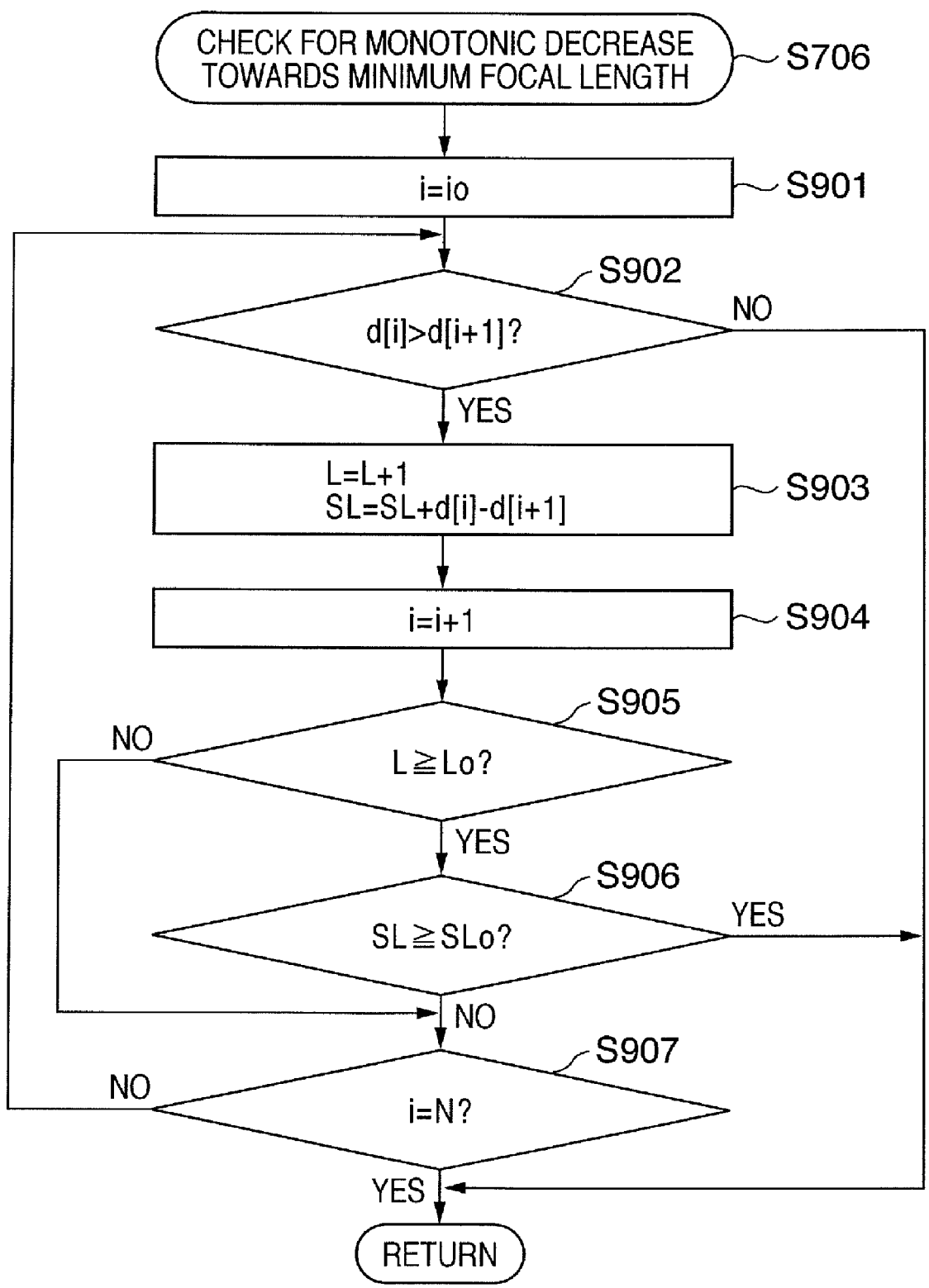
FIG. 9 is a flow chart for describing operations related to confirming monotonic decrease towards the minimum focal length.

Now the process for checking the monotonic decrease towards the focus lens position equivalent to minimum focal length in step S706 is described, with reference to the flow chart in FIG. 9.

First, in step S901, the counter variable i is initialized to io. Then the value d[i] of the AF evaluation value at scan point i is compared with the value d[i+1] of the AF evaluation value at scan point i+1 closer to the minimum focal length by one scan point from i. If d[i] is larger than d[i+1], ("yes" in step S902), monotonic decrease towards the minimum focal length is determined as occurring, the process moves to step S903, and the variable L expressing the width of the hill of the AF evaluation value and the variable SL expressing the height of the hill are updated according to the following formulas.

$$L = L + 1$$

$$SL = SL + (d[i] - d[i+1])$$

Then in step S902, if d[i]>d[i+1] does not hold true, it is determined that monotonic decrease towards the minimum focal length is not occurring, the process for checking monotonic decrease towards the minimum focal length is finished, and the process moves to step S707.

After the process in step S903, the process moves to step S904, in which i=i+1, and the point for detection is moved towards the minimum focal length by one scan point.

In steps S905 and S906, L and SL are compared with threshold values Lo and SLo related to the width and height of the hill for deeming that it is a hill, and determined whether or not they are equal to or greater than the threshold values. If they are both equal to or greater than the threshold values, the conditions in the process for determining the reliability of the AF evaluation value performed in steps S708 and S709 in FIG. 7, discussed below, are already met, so the process for checking monotonic decrease towards the minimum focal length is not performed, and the process moves to step S707.

In the case of "no" in step S905 or S906, the process moves to step S907, and the counter i is checked to see whether or not it has reached the value equivalent to minimum focal length (=N). If the value of the counter i is not N, then the process returns to step S902 and the above processes are repeated. If it is N, or in other words, if the scan point has reached the position of the minimum focal length, the process for checking for monotonic decrease towards the minimum focal length is finished, and the process moves to step S707.

Thus, monotonic decrease towards the minimum focal length is checked from i=io.

If the checks for monotonic decrease towards the maximum and minimum focal lengths are finished, all coefficients for determining the reliability of the AF evaluation value are compared to their respective threshold values, and if all the conditions are met, the AF evaluation value is determined to be reliable.

In step S707, the difference between maximum value max and minimum value min of the AF evaluation value is compared to a threshold value, and if it is smaller than the threshold value, reliability is determined to be lacking, and the process moves to step S711. Note that this threshold value is set low so that detection is only successful in cases where the contrast is definitely low. If the answer in step S707 is "yes," in step S708 the length L of the portion sloping at a slope equal to or greater than a certain fixed value is compared with a threshold value Lo, and if it is smaller than the threshold value Lo, reliability is determined to be lacking, and the process moves to step S711. If the answer in step S708 is "yes," then in step S709, the height SL is compared with SLo, and if this is smaller than the prescribed value, reliability is determined to be lacking, and the process moves to step S711.

If all three of the above conditions are met, the AF evaluation value is determined to be reliable, and the process moves to step S710, and the position is obtained for driving the focus lens from the AF evaluation value computed by the AF evaluation value computing section 122. This is calculated by obtaining, through interpolation, etc., the position at which the discretely calculated AF evaluation value is highest.

If the AF evaluation value is determined not to be reliable and the process moves to step S711, it is determined that focus was not successfully detected.

As described above, according to the above embodiment, even in cases where the contrast on the face is low and focus cannot be detected, or even in cases where objects with differing distances such as faces and the background are mixed in the focus detection area, it is possible to focus on a person with accuracy.

Note that in the above embodiment, the focus lens is driven to the in-focus position of the face position if focus is detected successfully at the face position. However, there exists the possibility of the focus detection result at the face position resulting in the focus being too far back due to being affected by the contrast of the background. For this reason, it is possible to determine the focus detection results at the face position correct and to drive the focus lens to the in-focus position at the face position only if the difference between the in-focus positions at the face position and at the body position are equal to or less than a prescribed value, and to drive the focus lens to the in-focus position of the body position if the difference is larger than the prescribed value.

Note that if the face is not successfully detected, it is also possible to perform focus detection by setting the focus detection frame in the center of the frame, for example.

Second Embodiment

A second embodiment is described below.

(Abbreviated Constitution of a Digital Camera)

Figure 10:
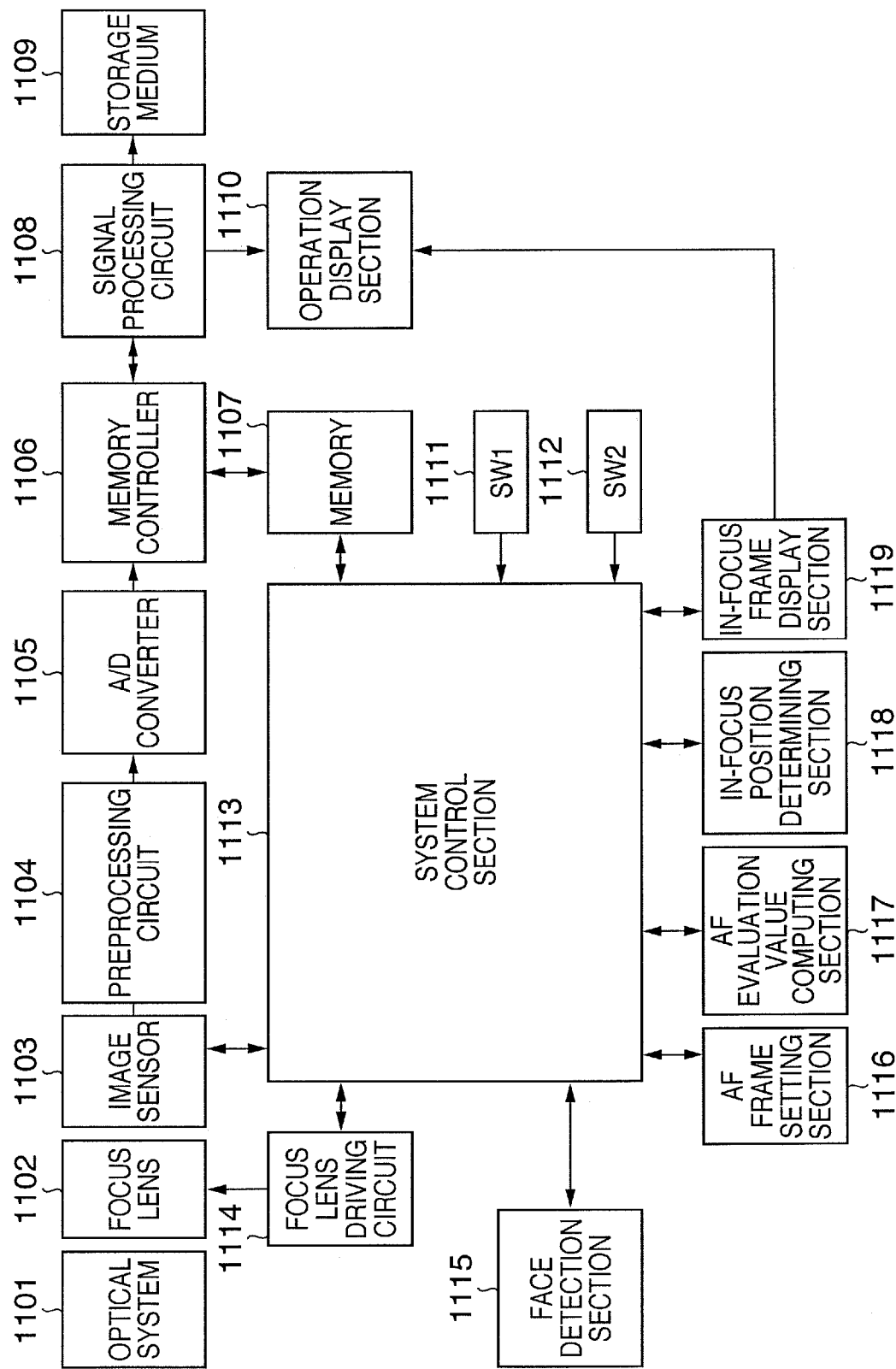
FIG. 10 is a block diagram showing a configuration of an image capturing apparatus of a second embodiment.

FIG. 10 is a view showing an abbreviated constitution of a digital camera for performing focus operations using the face detection function.

The digital camera has a photographing optical system made up of an optical system 1101, a focus lens 1102, and so on. Light captured by the photographing optical system (the object image) is photoelectrically converted by an image sensor 1103. A signal digitized via an A/D converter 1105 and a pre-processing circuit 1104 provided with a non-linear amplifying circuit and a CDS circuit for eliminating output noise is stored in a memory 1107 via a memory controller 1106. This is converted into an image by a signal processing circuit 1108 and stored on a storage medium 1109. Note that 1110 is an operation display portion for displaying a captured frame and an AF frame (a frame showing the area corresponding to the focus detection area on the image sensor) when capturing an image, as well as for displaying images and camera state information. General display control of these displays is done by a system control section 1113. 1111 is a switch (hereafter "SW1") for giving a photography standby operation command, and 1112 is a photography switch (hereafter "SW2") for giving a photography command after the SW1 is operated.

Focusing operation is controlled by the system control section 1113. First, a face detection section 1115 detects face information including a face position. Regarding the method of detecting the face, a publicly known method can be used. In this case, the position of the face and size information are obtained. Next, the AF frame (the focus detection area in the image sensor) is set by an AF frame setting section 1116 as described below, and a focus lens 1102 is moved by a focus lens drive circuit 1114. While moving the focus lens, captured image signals captured at a plurality of focus lens positions are used to compute a signal corresponding to the contrast of the captured image signal (a signal expressing the focus state, etc.) in an AF evaluation value computing section 1117. Next, an in-focus position determining section 1118 determines an in-focus position and the focus lens is controlled and driven to that position, and an in-focus frame is displayed to the operation display section 1110 by an in-focus frame display section 1119. Note that AF and other photography standby operations are performed by operating the SW1, and that operation of the SW2 causes photography and storage of an image to be performed.

Computation of the AF evaluation value is performed as follows. A horizontal band pass filter is applied to each line in the image data inside the focus detection area. Next, for each line, the band pass output signal with the largest absolute value is selected. The selected signals are vertically integrated. With the above constitution, the largest contrast in the horizontal direction is detected, and integrating this vertically obtains a signal with an improved S/N ratio. This signal has the largest value in an in-focus state, and the value decreases in unfocused states. Accordingly, an in-focus image can be obtained by detecting the focus lens position where the signal is at its maximum value and photographing at that position.

(Process of Operation of the Digital Camera)

A detailed description of the operation of the digital camera is given below with reference to the flow chart in FIG. 11.

First, the state of the main switch for supplying power to the system (not shown) is detected in step S1201, and if this is on, the process moves to step S1202. In step S1202, the remaining capacity of the storage medium 1109 is checked, and if this is 0 (zero), the process moves to step S1203, and if not, to step S1204. In step S1203, a warning that the remaining capacity of the storage medium 1109 is 0 is provided, and the process returns to step S1201. The warning may be displayed to the operation display section 1110, via a warning sound from an audio output section (not shown), or by both.

In step S1204, the state of the switch SW1 is checked, and if it is on, the process moves to step 31206, and if not, to step S1205. In step S1205, the state of a main switch (not shown) is checked, and if it is on, the process moves to step S1204, and if not, to step S1201. In step S1206, an AE process is performed, and in step S1207, an AF operation is performed according to the flow chart in FIG. 12 discussed below. In step S1208, the state of the SW2 is checked, and if it is on, the process moves to step S1210, and if not, to step S1209. In step S1209, the state of the SW1 is checked, and if it is on, the process returns to step S1208, and if not, to step S1204. In step S1210, a photography operation is performed according to the flow chart in FIG. 14 discussed below. In step S1211, the remaining capacity of the storage medium 1109 is checked, and if this is 0 (zero), the process moves to step S1203, and if not, to step S1212. In step S1212, the state of the SW2 is checked, and if it is not on, then the process moves to step S1209.

(AF Operation if Only One Face is Detected)

Figure 11:
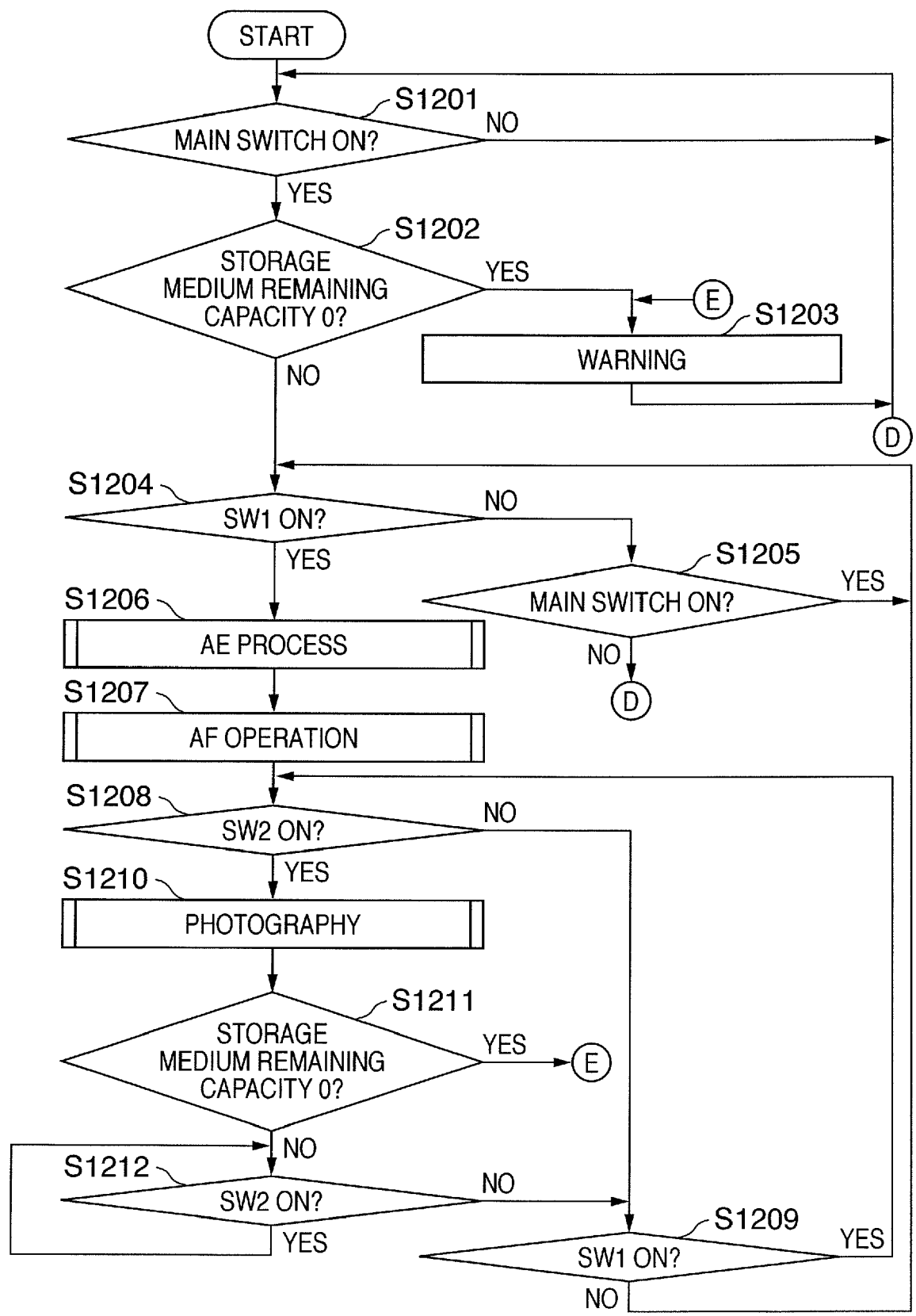
FIG. 11 is a flow chart representing operation of the image capturing apparatus of the second embodiment.

The AF operation sub-routine in step S1207 in the flow chart in FIG. 11 is described below, with reference to the flow chart in FIG. 12.

In step S1301, face detection is performed by a face detection section 1115. In step S1302, the size of the AF frame is determined by the detected face size, and a plurality of AF frames are set within a possible range in the photography frame at the detected face position and along a plumb line direction along which a body is expected to be present with regard to the face position.

Figure 13A:
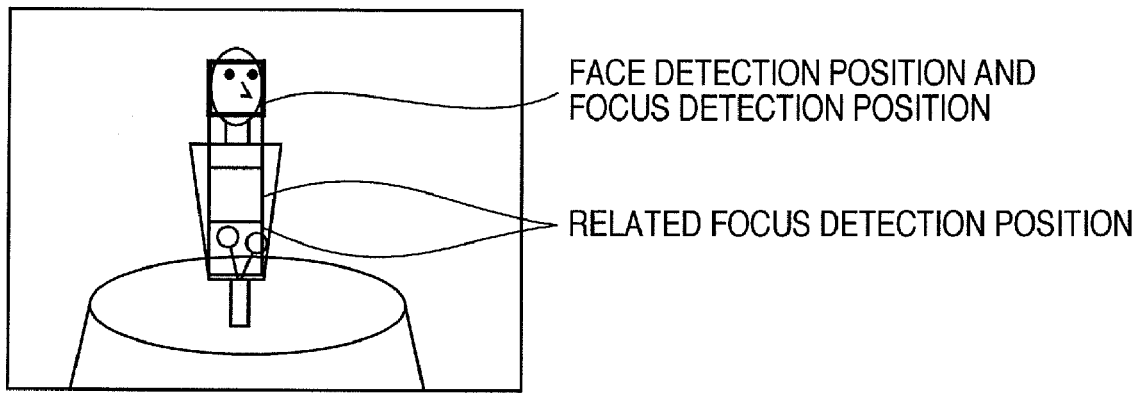
FIGS. 13A to 13C are views showing examples of a face detection position and an AF position.

For example, as shown in FIG. 13A, an AF frame is set at the position and size of the face obtained by the face detection section 1115 with regard to the face position. Further, a plurality of AF frames of the same size as the AF frame set for the face position are lined up and set if possible down to the position of the chest and abdomen of the face object along a plumb line direction from the face position along which a body is expected to be positioned.

At this time, depending on the position and size of the detected face, it might not be possible to set AF frames along a direction along which a body is expected to be present with respect to the face position inside the photography frame, and therefore an AF frame is only set at the face position.

In step S1303, a focus detection operation is performed in the focus detection area corresponding to the AF frame. In step S1304, a determination is made as to whether or not an in-focus position was successfully obtained by detecting focus in the focus detection area corresponding to the AF frame at the face position. If an in-focus position is successfully obtained, in step S1305 the focus lens is moved to the in-focus position in the focus detection area corresponding to the face position AF frame, and if an in-focus position is not successfully obtained, the process moves to step S1306. In step S1306, a check is made to see if AF frames were set in step S1302 in a direction along which a body is expected to be present with respect to the face position. If AF frames are set in a direction along which the body is expected to be present with respect to the face, the process moves to step S1309, and if the AF frame is only set to the face position, then the process moves to step S1307. In step S1309, a check is made to see whether a plurality of AF frames were set in a direction along which a body is expected to be present with respect to the face position for which an in-focus position was successfully obtained, and if there is a plurality, then the process moves to step S1310 in which focus detection is performed and the focus lens is moved from the corresponding focus detection area to an in-focus position farther away from the object. If there is not a plurality, then the process moves to step S1311. In step S1311, a check is made to see if an in-focus position was successfully obtained in the focus detection area corresponding to any one of the AF frames in the direction along which a body is expected to be present with respect to the face position, and if it was, then the focus lens is moved to the in-focus position obtained in step S1312. If no in-focus position was successfully obtained in the focus detection area corresponding to any of the AF frames, the process moves to step S1307, the focus lens is moved to a pre-set position called a fixed point, and an un-focused display is performed in step S1308.

In step S1313, in-focus display is performed at the face detection position. In the case of a camera equipped with a face detection function, if it is determined that face detection is possible and that it is possible to detect an in-focus position at the face position of the object or immediately below the face position, then in-focus display is performed at the face position. This is because in-focus display at the face position makes it easier to understand that the person (the intended object) is focused on than in-focus display on the position for which focus is actually detected (the area of the body, etc.).

Note that the determination of whether an in-focus position can be obtained or not can be done, for example, by determining whether or not the difference between minimum and maximum values of the AF evaluation value during focus detection are equal to or greater than a prescribed value.

By using the constitution described above, the face object can focused on even if obstacles are present at closer distances at the body position of the detected face object as shown in FIG. 13A and AF is not possible at the face position.

(Photography Operation)

Figure 14:
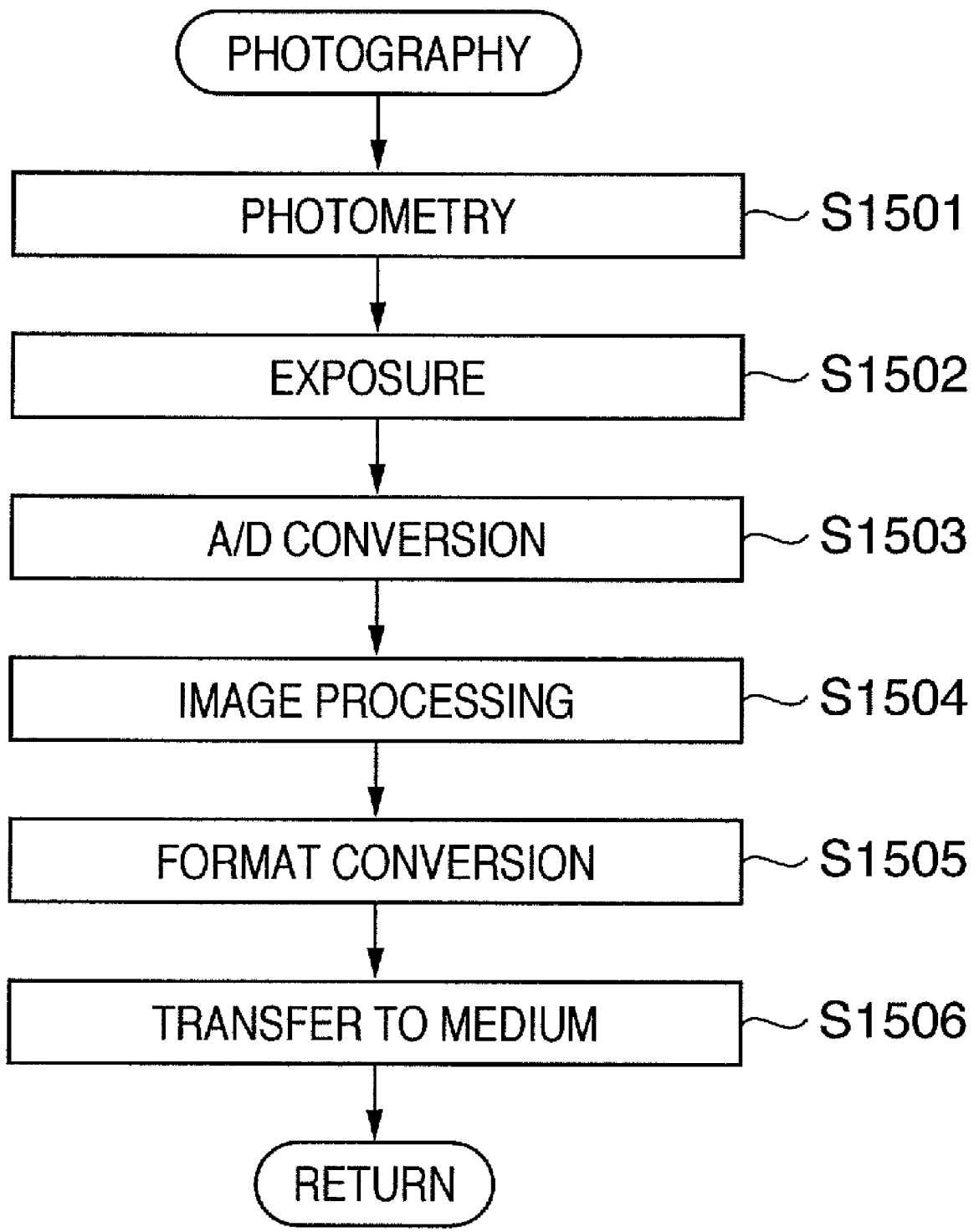
FIG. 14 is a flow chart of a sub routine for photography operation in FIG. 11.

The photography operation sub-routine in step S1210 in the flow chart in FIG. 11 is described below, with reference to the flow chart in FIG. 14.

First, the brightness of the object is measured in step S1501. In step S1502, exposure is performed on the image sensor 1103 in accordance with the object brightness measured in step S1501. The image captured on the surface of the image sensor 1103 is photoelectrically converted and becomes an analog signal, is sent to the A/D converter 1105 in step S1503, and is converted to a digital signal after pre-processing, such as elimination of output noise from the image sensor 1103, non-linear processing, etc. The output signal from the A/D converter 1105 is made into a correct output image signal in step S1504 by a signal processing circuit 1108, the output image signal is converted into an image format such as JPEG format in step S1505, and is transferred and stored in a storage medium 1109 in step S1506.

A constitution is thus achieved in which an in-focus position can be obtained by setting an AF frame (focus detection area) at a position which does not include the detected face even in cases where the focus cannot be adjusted because the face contrast is too low. By detecting focus at the position of the body measured from the detected face in this fashion, it is possible to adjust focus to the detected face object even if the face contrast is too low. It is possible to focus on the intended object without adjusting the focus on obstacles even if closer obstacles are present in the body position of the detected face object.

Note that in the above description, the intended object was described as a person, but this is not a limitation. For example, cases are also conceivable in which the object image is clipped from the background. In this case, the object may be an object other than a person whose size is to a certain extent known, and whose position of area other than the clipped detected area is known.

In the above description, a constitution was used in which the focus detection results are not referenced in the focus detection areas corresponding to a plurality of AF frames in a direction along which a body is expected to be present with respect to the face position when focus is successfully detected at the face position. However, it is also possible to estimate an in-focus position for the focus lens using both the focus detection results at the face position and the focus detection results at a position along which the body is expected to be present with respect to the face position.

(AF Operation if a Plurality of Faces are Detected)

Figure 12:
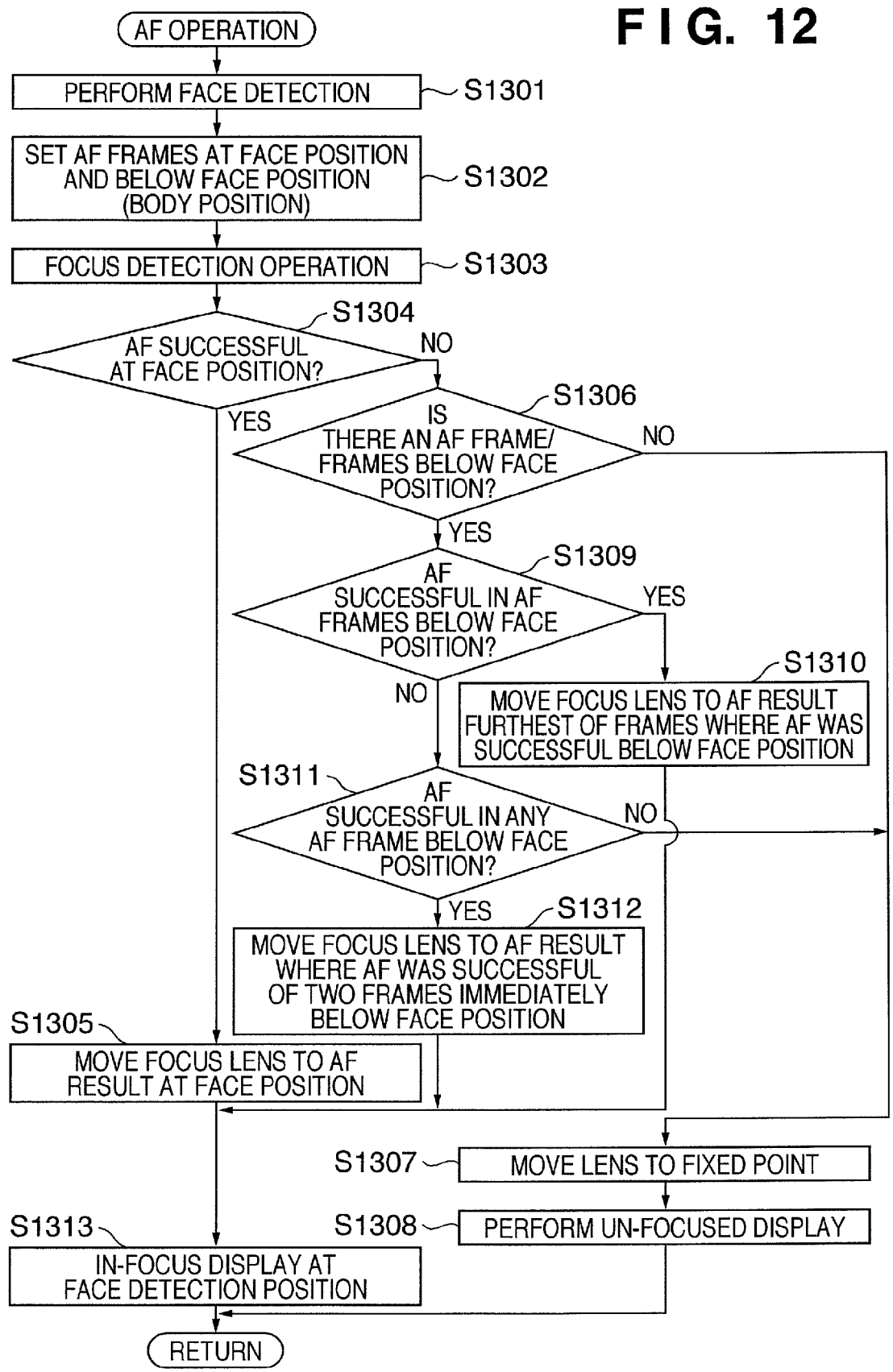
FIG. 12 is a flow chart of a sub routine for AF operation in FIG. 11.

Next, AF operation when a plurality of faces are detected is described, with reference to the flow chart in FIG. 12. The method for setting AF frames when there is a plurality of face positions detected by the face detection section 1115 is different from the above. Other aspects are the same, so description of their operation is omitted.

In step S1301, face detection is performed by a face detection section 1115. In a case in which there are two or more faces detected, a main face selection process is implemented for selecting a face which is to be the main object (a main face). Selection of the face to be the main face is done taking into consideration information regarding past faces acting as main faces, reliability indicating the accuracy of the detected face, the size of the face, the position of the face, and so on. Two other pieces of information are obtained: information on the face to be the main object and information on other detected faces.

When a plurality of faces are detected, AF frames are set and focus states are detected for as many of the faces as possible, thus making it easier to check whether or not the focus is on the user's intended object. Accordingly, in step S1302, first the size of an AF frame is determined based on the main face size. Next, the vertical and horizontal intervals of the AF frames are set, giving priority to positioning the AF frames for the other plurality of detected faces. Next, AF frames are set in a direction along which bodies are expected to be present with respect to each detected face position. In step S1303, focus detection operations are performed in the focus detection areas corresponding to the AF frames. In step S1304, a determination is made as to whether or not an in-focus position was successfully obtained by detecting focus in the focus detection area corresponding to the AF frame at the main face position. If an in-focus position is successfully obtained, the focus lens is moved to the in-focus position at the focus detection area corresponding to the AF frame of the main face position in step S1305. If an in-focus position was not successfully obtained in the focus detection area corresponding to the AF frame of the main face position, the process moves to step S1306.

Note that in the above, the main face and (the AF result of) the dependent frame thereon is the subject of the focus detection result referenced during focus lens control, and that frames for faces other than the main face are used only for deciding whether or not to bring up the in-focus display.

Figure 13B:
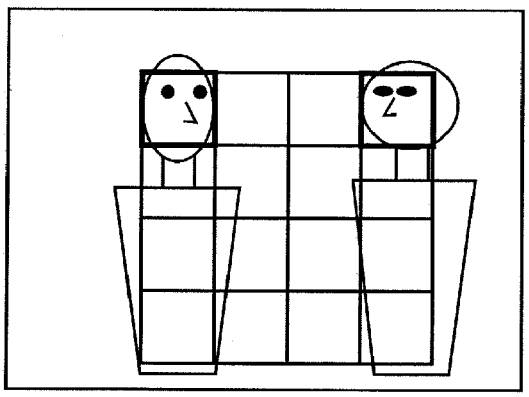
Figure 13C:
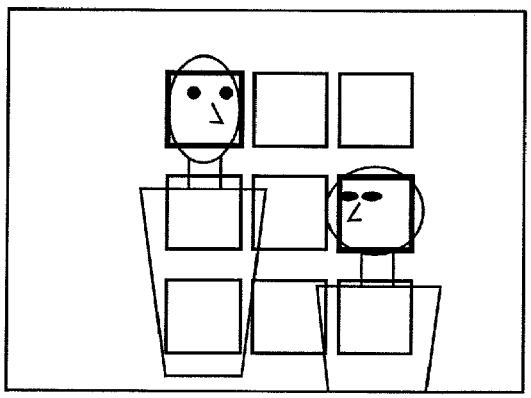

In this case, if the interval of the AF frames is set to 0, the AF frame positioned immediately below the face position is often set to the position of the neck of the face object, and the results of obtaining the in-focus position through focus detection are very frequently an in-focus position farther away from the face object due to near-far conflict with the background. For this reason, the focus detection area in the direction in which the body is expected to be present with respect to the face position associated with that face is made to be the AF frame two below the face position AF frame (skipping one), and the focus detection area corresponding to the AF frame one further below that (FIG. 13B) In a case in which there is an interval between AF frames, the focus detection area in the direction in which a body is expected to be present with respect to the face position associated with the face is made to be the focus detection area corresponding to the AF frame immediately below and adjacent to the face position AF frame, and the focus detection area corresponding to the AF frame immediately below that (FIG. 13C).

In step S1306, a check is made to see if AF frames were set in step S1302 in a direction along which a body is expected to be present with respect to the main face position. If AF frames are set at positions along which a body is expected to be present with respect to the main face, the process moves to step S1309, and if an AF frame is only set to the face position and no AF frames are set to positions along which a body is expected to be present with respect to the main face, the process moves to step S1307. In step S1309, a check is made to see if there is a plurality of AF frames in a direction along which a body is expected to be present with respect to the main face position for which an in-focus position was successfully obtained. If there is a plurality, the process moves to step S1310 and focus detection is performed, and the focus lens is moved to the in-focus position furthest from the object from among the focus detection areas corresponding to the plurality of AF frames corresponding to the plurality of AF frames for which in-focus positions were successfully obtained. If there is not a plurality, then the process moves to step S1311. In step S1311, a check is made to see if an in-focus position was successfully obtained in a focus detection area corresponding to one of the AF frames in the direction along which a body is expected to be present with respect to the main face position. If it was successfully obtained, then the focus lens is moved to the in-focus position obtained in step S1312. If an in-focus position was not successfully obtained even in a focus detection area corresponding to any of the AF frames in the direction along which a body is expected to be present with respect to the main face position, the process moves to step S1307. The focus lens is moved to a pre-set position called a fixed point, and unfocused display is performed in step S1308.

In step S1313, in-focus display is performed at the main face detection position. In the case of a camera equipped with a face detection function, if it is determined that face detection is possible and that it is possible to detect an in-focus position at the face position of the main object or the position immediately below the face position where a body is expected to be present with respect to the face position, then in-focus display is performed at the face position. This is because in-focus display at the face position makes it easier to understand that the person (the intended object) is focused on than in-focus display on the position for which focus is actually detected (the area of the body, etc.). When performing in-focus display of the main face frame, the face frame is also displayed in-focus if the difference between the AF result for the AF frame for the main face and the AF result for the AF frame associated with face frames other than the main face is within a predetermined depth.

By performing focus detection and in-focus display through control as described above, it is possible to clearly inform the user which object is being focused on.

In the above description, the main face is selected first, and then focus adjustment is made so as to focus on the main face (or on a position where a body is expected to be present with respect to the main face if focus detection on the main face was not possible). A constitution has been adopted wherein once an in-focus state is achieved, an in-focus display is performed. However, this is not a limitation, and a constitution may be adopted in which AF results are used which are the furthest away, regardless of whether they are for the main face or another face, from among the results of the AF frame setting and focus detection, as shown in FIG. 13B and FIG. 13C. A constitution may also be adopted to determine which AF results to use, according to a priority order of faces which has been pre-detected.

(AF Operation when Using Information Estimating the Object Distance from the Face Size)

Next, a description is given of using information wherein the object distance is estimated from the face size in the selection method of the AF results in the focus detection areas corresponding to the plurality of AF frames associated with the main face. Other aspects are the same, so description of their operation is omitted.

Next, in step S1310 of the flow chart in FIG. 12 discussed above, a constitution is adopted in which the focus lens is moved based on the AF results of the focus detection area corresponding to the AF frame at a distance within the object field depth with regard to the estimated distance calculated from the face size of the main face, and closer to the estimated distance.

The estimated distance is obtained as follows from the face size detected by the face detection section 1115. Assuming an actual standard face size to be Lstd, the size of the face area detected on the image to be L, and the focal length to be f, the estimated distance d can be obtained with $$d = f(1 + Lstd/L)$$

Further, assuming the diameter of the permissible circle of confusion to be $\partial$, the F stop of the optical system to be F, then the rear distance dB and the front distance dC entering the depth with regard to the in-focus distance dA can be obtained with $$dB = dA + F\partial dA2/(f2 - dAF\partial)$$

$$dC = dA + F\partial dA2/(f2 + dAF\partial)$$

Accordingly, assuming the rear distance and the front distance entering the depth with respect to the estimated distance d obtained from the face size to be db and dc, respectively, and the AF results in the focus detection areas corresponding to the plurality of AF frames associated with the face to be dj (j=0, 1, . . . , N), determination is made using the following formula.

$$dc < dj < db$$

By making this determination, of the AF results in the focus detection areas corresponding to the plurality of AF frames associated with the face, the AF results outside the object field depth of the face can be eliminated, and the AF results dj closer than the estimated distance d can be selected. In terms of the effect, erratic AF can be avoided in scenes in which the body of the face object is not positioned in a position in which the body is expected to be present with respect to the detected main face.

In the above description, it was made possible to select only those AF results within the object field depth with regard to the estimated distance obtained on the basis of the face size, but a constitution may also be adopted in which the AF results within a range which is α times the object field depth (within a predetermined range) are adopted.

Note that in the above description, the focus lens is driven to the AF result of the face position if AF is successful at the face position. However, there exists the possibility of the result at the face position resulting in the focus being too far back due to being affected by the contrast of the background. For this reason, a constitution may be adopted in which the AF result at the face position is only deemed correct when the AF distances at the face position and at the position of the body corresponding thereto are close, and the focus lens is moved to the AF result for the face position. In this case, a constitution is adopted in which if the AF distances for the face position and for the body position corresponding thereto are not close, the focus lens is driven according to the AF result of the body position.

Note that if the face is not successfully detected, it is also possible to perform AF by setting the focus detection area in the center of the frame, for example.

Moreover, in the description above, an image capturing apparatus having an image capturing optical system such as a zoom lens and a focus lens was described as an example of a focus adjustment apparatus, but this is not a limitation. For example, focus adjustment apparatuses such as telescopes and microscopes are also possible.

With the constitution as described above, it is possible to focus on the user's intended object in a groundbreaking fashion compared with the past, even in cases in which the face contrast is low and AF is impossible, or cases in which objects with differing distances, aside from the face, are present in the focus detection area.

In the above description, a signal in the focus detection area of the image sensor was obtained, an evaluation value indicating a focus state was computed, and an in-focus position of the focus lens was detected, but this is not a limitation. For example, it is also possible to provide a plurality of focus detection areas whose positions correspond to the image sensor on an AF sensor in phase-difference AF, detect a focus state in a focus detection area on the AF sensor corresponding to the body of the object, and perform movement control of the focus lens based on the focus state.

Figure 15:
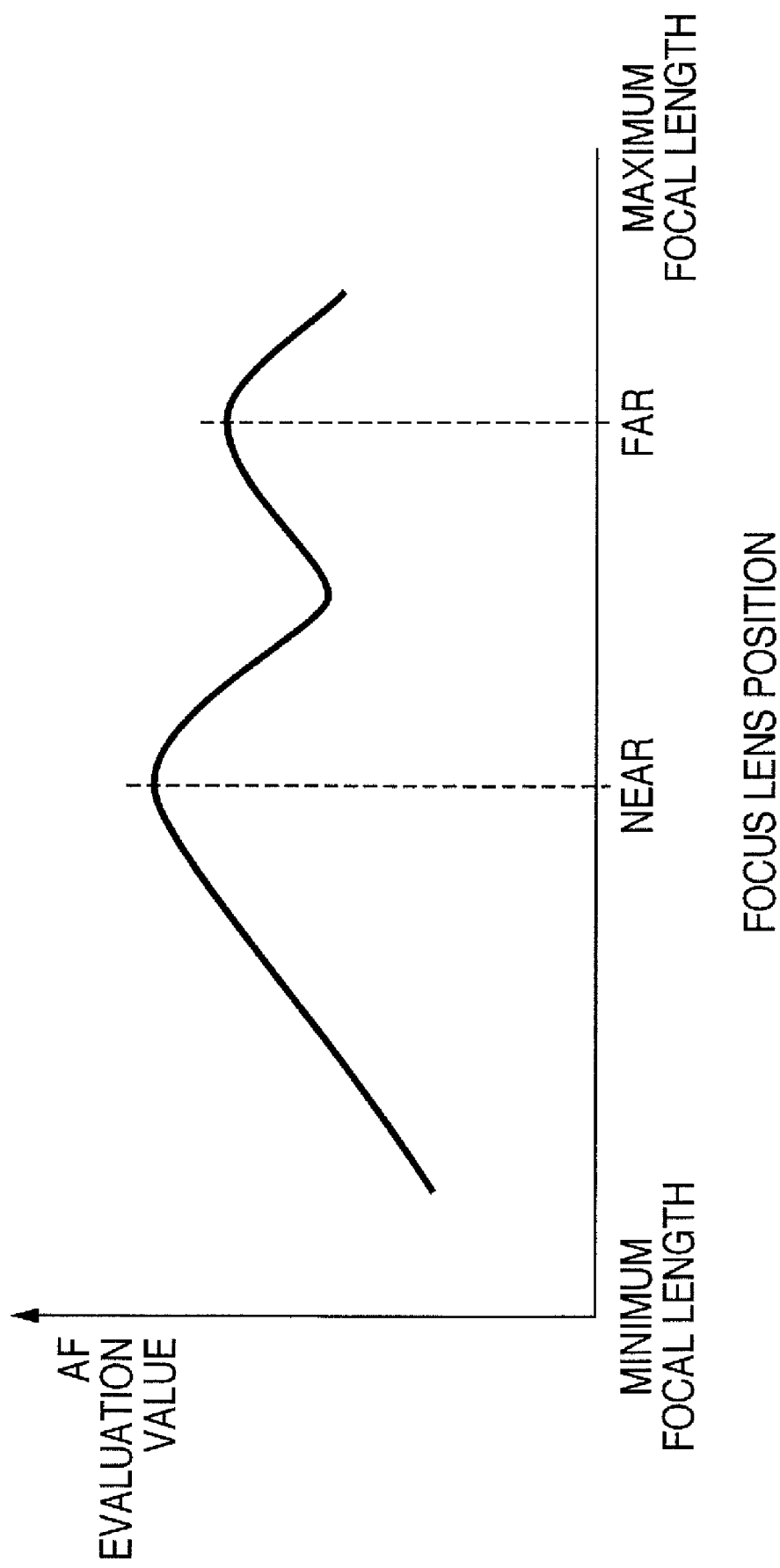
FIG. 15 is a view showing an evaluation value when a plurality of focus lens in-focus positions are detected in a single focus detection area.

In the above description, a constitution was adopted in which a plurality of focus detection areas is provided to positions at which a body is expected to be present with respect to the face of the object, and an evaluation value was detected indicating focus states. This matter can also be applied to cases in which an evaluation value, indicating a focus state obtained in a single focus detection area provided to a position in which a body is expected to be present with respect to a face, indicates a plurality of in-focus positions (see FIG. 15). In other words, if a plurality of in-focus positions of the focus lens are detected in a single focus detection area corresponding to the position of the body of an object (near and far in FIG. 15), the focus lens can be moved to the farther in-focus position of the focus lens. This way it is possible to focus on the user's intended object in a groundbreaking fashion compared to the past, even in cases in which there are objects with differing distances in front of the body of the object, such as flower vases, tables, and so on. This is based on the fact that in general the object's body is present in a plumb line direction from the face of the object, and there is not an empty space there. Even if this is not the case, accurate detection is possible by calculating the estimated object distance from the face size and selecting from within a prescribed depth.

Other Embodiments

The object of these embodiments can be attained by the following methods. In other words, a system or apparatus is provided with a storage medium (or a recording medium) in which is stored program code of software for realizing the functionality of the embodiments described above. A computer (or CPU or MPU) of that system or apparatus reads and executes the program code stored in the storage medium. In this case, the program code read from the storage medium realizes the functionality of the embodiments described above, and the storage medium on which is stored the program code constitutes the present invention. Not only is the functionality of the embodiments described above realized by executing the program code read by the computer, but the following cases are also included in the invention. In other words, an operating system (OS) or the like running on the computer performs all or part of the actual processes based on the instructions in the program code, and the functionality of the embodiments described above is realized through those processes.

Further, the following cases are also included in the invention. The program code read from the storage medium is read into memory provided to a function enhancing card inserted into the computer or a function enhancing unit connected to the computer. Cases in which a CPU, etc., provided to the function enhancing card or the function enhancing unit performs all or part of the actual processes based on the instructions of the program code and the functionality of the embodiments described above is realized by those processes are also included.

When applying the present invention to the above storage medium, the program code corresponding to the procedure described above is stored on that storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-131810, filed May 10, 2006, and No. 2006-249748 filed Sep. 14, 2006, which are hereby incorporated by reference herein in their entirety.

What is claimed is:

1. An image capturing apparatus comprising:
 a face position detection unit that detects a position at which a face of a person exists from a captured image;
 a setting unit that sets a focus detection area for detecting a focus state of a focus lens;
 a focus adjustment unit that performs a focus adjustment by moving the focus lens based on an output signal in the focus detection area;
 a display unit that displays the captured image; and
 a display control unit that controls said display unit to display an in-focus display on said display unit at a position at which the face of the person exists, regardless of whether the focus adjustment is performed based on the in-focus position of the focus lens which is obtained by said focus adjustment unit using the output signal in a first focus detection area at which the face of the person exists or based on the in-focus position of the focus lens which is obtained by said focus adjustment unit using the output signal in a second focus detection area in which it is estimated based on a position and a size of the face of the person that the person's body is present, wherein the second focus detection area is an area in which it is estimated based on an orientation of the apparatus that the person's body is present.

2. The apparatus according to claim 1, wherein said focus adjustment unit performs the focus adjustment based on the in-focus position in the second focus detection area in a case that the in-focus position cannot be detected in the first focus detection area after the output signals from the first focus detection area and the second focus detection area are obtained.

3. An image capturing apparatus comprising:
a face position detection unit that detects a position at which a face of a person exists from a captured image;
a setting unit that sets a focus detection area for detecting a focus state of a focus lens;
a focus adjustment unit that performs a focus adjustment by moving the focus lens based on an output signal in the focus detection area;
a display unit that displays the captured image; and
a display control unit that controls said display unit to display an in-focus display on said display unit at a position at which the face of the person exists, regardless of whether the focus adjustment is performed based on the in-focus position of the focus lens which is obtained by said focus adjustment unit using the output signal in a first focus detection area at which the face of the person exists or based on the in-focus position of the focus lens which is obtained by said focus adjustment unit using the output signal in a second focus detection area in which it is estimated based on a position and a size of the face of the person that the person's body is present, wherein the second focus detection area is an area in which it is estimated based on a tilt of the face of the person in a frame of a captured image that the person's body is present.

4. The apparatus according to claim 3, wherein said focus adjustment unit performs the focus adjustment based on the in-focus position in the second focus detection area in a case that the in-focus position cannot be detected in the first focus detection area after the output signals from the first focus detection area and the second focus detection area are obtained.

5. An image capturing apparatus comprising:
a face position detection unit that detects a position at which a face of a person exists from a captured image;
a setting unit that sets a focus detection area for detecting a focus state of a focus lens;
a focus adjustment unit that performs a focus adjustment by moving the focus lens based on an output signal in the focus detection area;
a display unit that displays the captured image; and
a display control unit that controls said display unit to display an in-focus display on said display unit at a position at which the face of the person exists, regardless of whether the focus adjustment is performed based on the in-focus position of the focus lens which is obtained by said focus adjustment unit using the output signal in a first focus detection area at which the face of the person exists or based on the in-focus position of the focus lens which is obtained by said focus adjustment unit using the output signal in a second focus detection area in which it is estimated based on a position and a size of the face of the person that the person's body is present, wherein when the focus adjustment is performed on the basis of the in-focus position of the focus lens which is obtained by said focus adjustment unit using the output signal in the second focus detection area, said display control unit controls said display unit to display at the same time (a) a first AF frame at the first focus detection area, (b) a second AF frame at the second focus detection area, and (c) the in-focus display.

6. The apparatus according to claim 5, wherein said focus adjustment unit performs the focus adjustment based on the in-focus position in the second focus detection area in a case that the in-focus position cannot be detected in the first focus detection area after the output signals from the first focus detection area and the second focus detection area are obtained.

7. The apparatus according to claim 5, wherein when a plurality of in-focus positions are detected, said focus adjustment unit moves the focus lens to an in-focus position corresponding to a farther distance in the plurality of in-focus positions.

8. The apparatus according to claim 5, wherein said setting unit sets a plurality of focus detection areas in which it is estimated that the person's body, which corresponds to the face of the person, is present in the second focus detection area and said focus adjustment unit detects the in-focus position of the focus lens for each of the plurality of focus detection areas.

9. The apparatus according to claim 5, further comprising an estimating unit that estimates an object distance from a size of the face of the person detected by said face position detection unit, wherein said focus adjustment unit deviates an in-focus position in a plurality of in-focus positions, which is not an in-focus position within a depth of photographing field of the object distance obtained by said estimating unit, from a target focus position, when a plurality of in-focus positions are detected.

10. The apparatus according to claim 5, wherein said focus adjustment unit detects an in-focus position in the second focus detection area in a case that the in-focus position of the focus lens cannot be detected in the first focus detection area.

11. The apparatus according to claim 5, further comprising an image sensor for obtaining the captured image.

12. A control method of an image capturing apparatus, comprising:
a face position detection step of detecting a position at which a face of a person exists from a captured image;
a setting step of setting a focus detection area for detecting a focus state of a focus lens;
a focus adjustment step of performing a focus adjustment by moving the focus lens based on an output signal in the focus detection area;
a display step of displaying the captured image on a display unit; and
a display control step of controlling the display unit to display an in-focus display on the display unit at a position at which the face of the person exists, regardless of whether the focus adjustment is performed based on the in-focus position of the focus lens which is obtained by said focus adjustment step using the output signal in a first focus detection area at which the face of the person exists or based on the in-focus position of the focus lens which is obtained by said focus adjustment step using the output signal in a second focus detection area in which it is estimated based on a position and a size of the face of the person that the person's body is present, wherein the second focus detection area is an area in which it is estimated based on an orientation of the apparatus that the person's body is present.

13. A computer readable storage medium storing a program which causes a computer to execute a control method recited in claim 12.

14. A control method of an image capturing apparatus, comprising:

a face position detection step of detecting a position at which a face of a person exists from a captured image;

a setting step of setting a focus detection area for detecting a focus state of a focus lens;

a focus adjustment step of performing a focus adjustment by moving the focus lens based on an output signal in the focus detection area;

a display step of displaying the captured image on a display unit; and a display control step of controlling the display unit to display an in-focus display on the display unit at a position at which the face of the person exists, regardless of whether the focus adjustment is performed based on the in-focus position of the focus lens which is obtained by said focus adjustment step using the output signal in a first focus detection area at which the face of the person exists or based on the in-focus position of the focus lens which is obtained by said focus adjustment step using the output signal in a second focus detection area in which it is estimated based on a position and a size of the face of the person that the person's body is present, wherein the second focus detection area is an area in which it is estimated based on a tilt of the face of the person in a frame of a captured image that the person's body is present.

15. A computer readable storage medium storing a program which causes a computer to execute a control method recited in claim 14.

16. A control method of an image capturing apparatus, comprising:

a face position detection step of detecting a position at which a face of a person exists from a captured image;

a setting step of setting a focus detection area for detecting a focus state of a focus lens;

a focus adjustment step of performing a focus adjustment by moving the focus lens based on an output signal in the focus detection area;

a display step of displaying the captured image on a display unit; and a display control step of controlling the display unit to display an in-focus display on the display unit at a position at which the face of the person exists, regardless of whether the focus adjustment is performed based on the in-focus position of the focus lens which is obtained by said focus adjustment step using the output signal in a first focus detection area at which the face of the person exists or based on the in-focus position of the focus lens which is obtained by said focus adjustment step using the output signal in a second focus detection area in which it is estimated based on a position and a size of the face of the person that the person's body is present, wherein when the focus adjustment is performed on the basis of the in-focus position of the focus lens which is obtained by said focus adjustment step using the output signal in the second focus detection area, said display control step controls the display unit to display at the same time (a) a first AF frame at the first focus detection area, (b) a second AF frame at the second focus detection area, and (c) the in-focus display.

17. A computer readable storage medium storing a program which causes a computer to execute a control method recited in claim 16.

18. The method according to claim 16, wherein in said focus adjustment step, when a plurality of in-focus positions are detected, the focus lens is moved to an in-focus position corresponding to a farther distance in the plurality of in-focus positions.

* * * * *